(12) United States Patent
Melchior et al.

(10) Patent No.: US 7,587,353 B2
(45) Date of Patent: Sep. 8, 2009

(54) PROVIDING CARGO INSURANCE IN A FULL SERVICE TRADE SYSTEM

(75) Inventors: Peter Melchior, Stamford, CT (US); Lenore Meltzer, Englewood, NJ (US)

(73) Assignee: TradeCard, Inc., New York, NY (US)

(*) Notice: Subject to any disclaimer, the term of this patent is extended or adjusted under 35 U.S.C. 154(b) by 1386 days.

(21) Appl. No.: 09/981,642

(22) Filed: Oct. 16, 2001

(65) Prior Publication Data

US 2002/0107785 A1     Aug. 8, 2002

Related U.S. Application Data

(60) Provisional application No. 60/240,818, filed on Oct. 16, 2000.

(51) Int. Cl.
       *G06Q 40/00*     (2006.01)
(52) U.S. Cl. ...................................................... 705/37
(58) Field of Classification Search .................... 705/4, 705/26, 30, 80, 37
See application file for complete search history.

(56) References Cited

U.S. PATENT DOCUMENTS

| | | | |
|---|---|---|---|
| 4,799,156 A | 1/1989 | Shavit et al. | |
| 5,359,509 A | 10/1994 | Little et al. | |
| 5,644,727 A | 7/1997 | Atkins | |
| 5,704,044 A | 12/1997 | Tarter et al. | |
| 5,717,989 A | 2/1998 | Tozzoli et al. | |
| 5,732,400 A | 3/1998 | Mandler et al. | |

(Continued)

FOREIGN PATENT DOCUMENTS

WO    WO 96/12242    4/1996

(Continued)

OTHER PUBLICATIONS

Leonard, Adrian: Internet sevice offered at Lloyd's; [5 Edition], Nov. 4, 1998, Journal of Commerce, p. 11.A.*

(Continued)

*Primary Examiner*—Hani Kazimi
*Assistant Examiner*—Bijendra K Shrestha
(74) *Attorney, Agent, or Firm*—Townsend and Townsend and Crew LLP

(57) ABSTRACT

The present invention provides a comprehensive, integrated, computerized system for facilitating transactions in goods or services. The system is capable of facilitating transactions from early or initial stages, such as an electronically proposed purchase order, through to later or final stages, such as payment on an invoice or invoices relating to the transaction. The system is integrated to include the participation of various providers of services ancillary to transactions, such as guarantors, insurers, and shippers.

The system may allow sellers or buyers to electronically propose amendments and counter-amendments to, and to amend, through mutual agreement, a purchase order agreement. Any amendments are accounted for in later stages of the transaction facilitated by the system. The system may monitor, utilizing stored transaction information, present and anticipated future credit exposures of buyers, and utilizes the buyer credit exposure information for purposes including facilitating providing buyer credit assurance to sellers. The system may facilitate sellers obtaining financing or advance payment relating to transactions. The system may provide opportunities for sellers or buyers to obtain cargo insurance on goods or services shipped in accordance with transactions.

13 Claims, 16 Drawing Sheets

U.S. PATENT DOCUMENTS

| | | | | |
|---|---|---|---|---|
| 5,842,178 | A | * | 11/1998 | Giovannoli .................. 705/26 |
| 5,870,711 | A | * | 2/1999 | Huffman ....................... 705/8 |
| 5,875,437 | A | | 2/1999 | Atkins |
| 5,970,470 | A | | 10/1999 | Walker et al. |
| 6,035,288 | A | | 3/2000 | Solomon |
| 6,055,514 | A | | 4/2000 | Wren |
| 6,058,378 | A | | 5/2000 | Clark et al. |
| 6,073,116 | A | | 6/2000 | Boyle |
| 6,115,690 | A | * | 9/2000 | Wong ............................ 705/7 |
| 6,128,602 | A | | 10/2000 | Northington et al. |
| 6,141,653 | A | * | 10/2000 | Conklin et al. ................ 705/80 |
| 6,151,588 | A | | 11/2000 | Tozzoli et al. |
| 6,167,385 | A | | 12/2000 | Hartley-Urquhart |
| 6,192,354 | B1 | | 2/2001 | Bigus et al. |
| 6,216,115 | B1 | | 4/2001 | Barrameda et al. |
| 6,219,653 | B1 | | 4/2001 | O'Neill et al. |
| 6,240,396 | B1 | | 5/2001 | Walker et al. |
| 6,351,738 | B1 | | 2/2002 | Clark |
| 6,360,211 | B1 | | 3/2002 | Anderson et al. |
| 6,739,517 | B1 | | 5/2004 | Krueger |
| 7,047,219 | B1 | | 5/2006 | Martin et al. |
| 7,069,234 | B1 | * | 6/2006 | Cornelius et al. ............. 705/26 |
| 2002/0007340 | A1 | * | 1/2002 | Isaf et al. ...................... 705/37 |
| 2002/0095373 | A1 | | 7/2002 | Melchior et al. |
| 2002/0099655 | A1 | | 7/2002 | Melchior et al. |
| 2002/0107785 | A1 | | 8/2002 | Melchior et al. |
| 2002/0120555 | A1 | * | 8/2002 | Lerner .......................... 705/37 |
| 2002/0156656 | A1 | * | 10/2002 | Harrell et al. ................... 705/4 |

FOREIGN PATENT DOCUMENTS

| | | |
|---|---|---|
| WO | WO 00/48053 | 8/2000 |
| WO | WO 00/55774 | 9/2000 |
| WO | WO 00/70519 | 11/2000 |
| WO | WO 01/33220 | 5/2001 |
| WO | WO 01/35286 | 5/2001 |
| WO | WO 01/35289 | 5/2001 |
| WO | WO 01/41096 | 6/2001 |
| WO | WO 01/75644 | 10/2001 |
| WO | WO 02/35514 | 4/2002 |

OTHER PUBLICATIONS

Ternef, Barry M.: Safeguarding shipments when going global. Sep. 1993. Risk Management, vol. 40, Issue 9; p. 20-26.*

PR Newswire, Noew York, Aug. 8, 2000 CAN Maritime Chooses Pilot Secure E-Business for its New Customer Extranet, p. 1.*

Willkie Farr & Gallagher, LLP, Tradecard's Memorandum In Support of Its Motion For Judgment as a Matter of Law, Apr. 26, 2006, Civil Action No. 03-CIV-1468 (AKH), 58 pgs.

King & Spalding, LLP, Defendants' Opposition To Tradecard's Motion For Judgment as a Matter of Law, May 30, 2006, Civil Action No. 03-CIV-1468 (AKH), 102 pgs.

Willkie Farr & Gallagher, LLP, Tradecard's Reply Memorandum In Support of Its Motion For Judgment as a Matter of Law, Jun. 15, 2006, Civil Action No. 03-CIV-1468 (AKH), 34 pgs.

Alvin K. Hellerstein, Opinion and Order Denying Motions For A New Trial and For Judgment as a Matter of Law, Sep. 6, 2007, Civil Action No. 03-CIV-1468 (AKH), 46 pgs.

Mohamed, Packeer, "Examining cash-flow forecasts," New Straits Times, Kuala Lumpur, Dec. 10, 1996, (5 pages).

Watterson, P., "Credit defaults swaps . . . ," Credit [online], Nov. 2002 [retrieved Mar. 28, 2007] from URL <http://www.srz.com/files/article-november02-creditefaultswaps.pdf>.

King & Spalding, LLP, Defendants' Opposition To Tradecard's Motion For Judgment as a Matter of Law, May 30, 2006, Civil Action No. 03-CIV-1468 (AKH), 102 pgs.

* cited by examiner

PROVIDING CARGO INSURANCE IN A FULL SERVICE TRADE SYSTEM

CROSS-REFERENCE TO RELATED PRIORITY APPLICATION

This application claims the benefit of U.S. Provisional Application Ser. No. 60/240,818, filed on Oct. 16, 2000 and entitled, "Trade System."

CROSS-REFERENCE TO RELATED PATENTS AND APPLICATION

This application is related to U.S. patent application Ser. No. 08/323,071, filed on Oct. 13, 1994, issued as U.S. Pat. No. 5,717,989 on Feb. 10, 1998, and entitled, "FULL SERVICE TRADE SYSTEM," which U.S. Patent is hereby incorporated herein by reference in its entirety, and to U.S. patent application Ser. No. 09/020,740, filed on Feb. 9, 1998, issued as U.S. Pat. No. 6,151,588 on Nov. 21, 2000 and entitled, "FULL SERVICE TRADE SYSTEM," which U.S. Patent is hereby incorporated herein by reference in its entirety. Further, this application is related to U.S. application Ser. No. 09/536,190, filed on Mar. 27, 2000, and entitled, "FULL SERVICE TRADE SYSTEM," which is hereby incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates in general to electronic trading systems and methods, and in particular to computerized systems and methods for facilitating transactions in one or more goods or services or services.

BACKGROUND OF THE INVENTION

There are many examples of situations and contexts in which buyers and sellers may enjoy advantages by utilizing an electronic trading system. As one of numerous examples of such contexts, buyers and sellers may wish to transact with one another even though they may have never met each other, or are unfamiliar with the reputations of each other's businesses. This is frequently the case, for example, in international trade, where the buyer and the seller are often strangers separated by large distances and international borders. In such situations, buyers and sellers may be understandably wary of transacting with each other. Sellers would be more comfortable receiving payment prior to the shipment of their goods, but buyers would be more comfortable receiving seller's goods prior to making payment. Without confidence in the opposing party, a buyer or seller may be reluctant or even unwilling to enter into a transaction.

For these and other reasons, a traditional paper system has developed, involving the participation of financial institutions, shippers, and use of such documents as the Letter of Credit (LOC) and the Bill of Lading (BOL). In such a system, a buyer has the buyer's bank issue a LOC guaranteeing to the seller's bank that payment will be made so long as specified agreed to terms such as shipment content, date, etc. are satisfied. In turn, the seller's bank guarantees payment to the seller so long as the specified terms are met.

Once the seller has complied with the specified terms, the seller must prove such to the seller's bank. This is often done by presenting a BOL to the seller's bank, which the seller received from the shipper upon presentation of the goods to the shipper. Other documents might also be required for presentation. Upon presenting appropriate documentation, the seller is paid by the seller's bank. The seller's bank is then reimbursed by the buyer's bank and the seller's bank gives the BOL to the buyer's bank. The buyer must then pay the buyer's bank in order to obtain the BOL from the buyer's bank. The buyer may then obtain the goods by presenting the BOL to the shipper upon delivery. The above-described traditional paper system, however, is burdened with various inefficiencies and may be prone to fraud, and represents one of many contexts in which an electronic trading system would be desirable which avoids disadvantages and inefficiencies of traditional paper trading systems.

Electronic systems for facilitating various aspects of trade and transactions are known in the art. Patent Cooperation Treaty international application, International Publication No. WO 00/48053, having inventors Mallon et al., published on Aug. 17, 2000, is entitled, "Commercial Transaction Management System and Method," and discloses a method and system for providing to commercial market participants a dedicated data processor for consolidating and expediting a financial settlement system. Upon placement of a commercial transaction order, various transaction documents such as the purchase order, confirmation order, invoice and bill of lading are transmitted to the data processor in electronic format and stored in a database. Following delivery of the goods or services to the buyer, the carrier generates a proof of delivery document which is thereafter forwarded to the data processor. The various transaction information is then audited and reconciled by the data processor, for purposed including facilitating early resolution of possible exceptions or problems which may prevent timely payment.

Patent Cooperation Treaty international application, International Publication No. WO 00/55774, having inventors Barry et al. (hereinafter, "Barry et al."), published on Sep. 21, 2000, is entitled, "Transaction Support System," and discloses a centralized database system for supporting transactions in property. The central database is accessed over a public network, such as the Internet, and forms a title registry recording the entitlements of the users, to allow performance of prescribed actions in relation to electronically related records. Barry et al. further discloses a method and system wherein the collection of transaction information may be processed to provide scoring of risk to a financial institution, such risk being calculated based upon individual transactions as well as the transaction history between the buyer and the seller.

Patent Cooperation Treaty international application, International Publication No. WO 01/41096, having inventors Katsman et al., published on Jun. 7, 2001, is entitled, "Secure Payment and Trade Management System," and relates to a system which recognizes and reserves funds against a credit account established by a buyer with a financial institution in the form of a credit card or bank line of credit used to issue an electronic documentary credit.

U.S. Pat. No. 6,167,385 issued on Dec. 26, 2000 to Hartley-Urquhart, entitled, "Supply Chain Financing System and Method," relates to financing a supply of goods from a supplier to a buyer, in which the buyer has a lower cost of funds than the supplier. The buyer generates a purchase order for the goods which is forwarded to the supplier who in turn ships the goods to the buyer. The supplier sends an invoice to the buyer and invoice data is stored in a database. The financing institution electronically accesses the database to retrieve daily invoices. The financial institution then calculates the financing applicable to the shipped goods and forwards payment to the supplier. Upon maturity of the financing, the buyer settles with the financial institution by remitting the gross proceeds.

Patent Cooperation Treaty international application, International Publication No. WO 00/70519, having inventors Falic et al. and published on Nov. 23, 2000 is entitled, "Network Accessible Quotation and Shipping System," and discloses a transportation logistics system. The system is intended to provide to vendors or shoppers, at the time of a purchase, a total global delivered cost quote for shipping a product between locations. The system is accessible over a circuit switched network, such as the Internet, and includes a Web server and a proprietary database. A total delivered cost engine retrieves the necessary information for the database, given the requestor input, and performs the necessary calculations. The total delivered cost quote, which includes any applicable inland origin freight, inland destination freight, air freight, ocean freight, insurance, duties, taxes custom clearance fee, import fee, or service fee is presented to the requestor.

While the above-described prior art systems are of utility in facilitating certain aspects of certain transactions in certain contexts, none provide a truly comprehensive, full-featured electronic trading system. Various qualities can be envisioned as ideally being present in an electronic trading system. The system ideally would be able to facilitate transactions from start through finish, and be able to access and utilize a database of trade information for various purposes, which database might contain information relating to numerous transactions between numerous sellers and buyers. The system ideally would allow as many trade-related features and functions as possible, for the convenience and efficiency of its users. The system would ideally integrate or allow access to ancillary service providers such as lenders, funders, guarantors, insurers, and shippers. Finally, the system would ideally work in an integrated fashion, permitting various synergies resulting from combinations of features.

Various particular features of a comprehensive trade system can be envisioned. A system that would allow a seller and a buyer to amend a previously agreed-to purchase order agreement would be desirable, to permit the buyer and the seller greater flexibility in the transaction. Such amendments would ideally be carried over to later aspects of the transaction. A system is further desirable that would be capable of monitoring credit exposures of buyers utilizing transaction information stored by the system, and that would utilize buyer credit exposure information for purposes including facilitation providing buyer credit assurance to sellers. The system would further ideally have access to existing buyer transactions to be able to project future credit exposure. The system would further ideally facilitate and utilize its stored trade information in facilitating sellers obtaining financing, for example, to produce goods to comply with a purchase order agreement. The system would further ideally facilitate and utilize its stored trade information in facilitating sellers obtaining advance payment on a purchase order agreement. For example, the seller might obtain advance payment from a lender who might then become entitled to payment from the buyer. The system would further ideally facilitate and utilize its stored trade information in facilitating providing cargo insurance on goods shipped in accordance with transactions facilitated by the system.

SUMMARY OF THE INVENTION

The present invention provides an improved a trade system, including allowing amendment of a purchase order agreement, providing buyer credit monitoring or facilitating providing buyer credit assurance, facilitating providing financing or advance payment for sellers, and providing cargo insurance.

In one embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for allowing electronic modification of the purchase order agreement upon agreement by the seller and the buyer to the modification; means for receiving and storing electronic evidence that the seller has performed in connection with fulfilling the seller's obligations as defined by the purchase order agreement as modified by any modifications; and, means for electronically evaluating whether the seller has complied with the seller's obligations as defined by the purchase order agreement as modified by any modifications.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for allowing electronic modification of the purchase order agreement upon agreement by the seller and the buyer to the modification; means for receiving and storing electronic evidence that the seller has performed in connection with fulfilling the seller's obligations as defined by the purchase order agreement as modified by any modifications; means for electronically evaluating whether the seller has complied with the seller's obligations as defined by the purchase order agreement as modified by any modifications; means for electronically providing a payment instruction if the seller has been evaluated to have complied with the seller's obligations as defined by the purchase order agreement as modified by any modifications; and, means for receiving and storing electronic evidence that the buyer has made one or more payments in connection with fulfilling buyer's obligations as defined by the purchase order agreement as modified by any modifications.

In another embodiment, the invention provides a computerized system for facilitating transactions in goods or services. The system includes: means for allowing electronic procurement of a purchase order agreement between a seller and a buyer, the purchase order agreement being stored electronically and relating to a transaction in one or more goods or services, comprising means for allowing electronic negotiation between the seller and the buyer relating to establishing the purchase order agreement; means for allowing electronic modification of the purchase order agreement upon agreement by the seller and the buyer to the modification; means for receiving and storing electronic evidence that the seller has performed in connection with fulfilling the seller's obligations as defined by the purchase order agreement; and, means for electronically evaluating whether the seller has complied with the seller's obligations as defined by the purchase order agreement.

In another embodiment, the invention provides a computerized system for facilitating transactions in goods or services. The system includes: means for allowing electronic procurement of a purchase order agreement between a seller and a buyer, the purchase order agreement being stored electronically and relating to a transaction in one or more goods or services, comprising means for allowing electronic negotiation between the seller and the buyer relating to establishing the purchase order agreement; means for allowing electronic modification of the purchase order agreement upon agreement by the seller and the buyer to the modification; means for receiving and storing electronic evidence that the seller has performed in connection with fulfilling the seller's obligations as defined by the purchase order agreement; means for electronically evaluating whether the seller has complied with the seller's obligations as defined by the purchase order agreement; means for electronically providing a payment instruction if the seller has been evaluated to have complied with the seller's obligations as defined by the purchase order agreement; and, means for receiving and storing electronic evidence that the buyer has made one or more payments in connection with fulfilling buyer's obligations as defined by the purchase order agreement as modified by any modifications.

In another embodiment, the invention provides a computerized method for facilitating transactions in goods or services. The method includes: allowing electronic procurement of a purchase order agreement between a seller and a buyer, the purchase order agreement being stored electronically and relating to a transaction in one or more goods or services; allowing electronic modification of the purchase order agreement upon agreement by the seller and the buyer to the modification; receiving and storing electronic evidence that the seller has performed in connection with fulfilling the seller's obligations as defined by the purchase order agreement; and, electronically evaluating whether the seller has complied with the seller's obligations as defined by the purchase order agreement.

In another embodiment, the invention provides a computerized method for facilitating transactions in goods or services. The method includes: allowing electronic procurement of a purchase order agreement between a seller and a buyer, the purchase order agreement being stored electronically and relating to a transaction in one or more goods or services; allowing electronic modification of the purchase order agreement upon agreement by the seller and the buyer to the modification; receiving and storing electronic evidence that the seller has performed in connection with fulfilling the seller's obligations as defined by the purchase order agreement; electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement as modified by any modifications.

In another embodiment, the invention provides a computerized method for facilitating transactions in goods or services. The method includes: allowing electronic procurement of a purchase order agreement between a seller and a buyer, the purchase order agreement being stored electronically and relating to a transaction in one or more goods or services, comprising allowing electronic negotiation between the seller and the buyer relating to establishing the purchase order agreement; allowing electronic modification of the purchase order agreement upon agreement by the seller and the buyer to the modification; receiving and storing electronic evidence that the seller has performed in connection with fulfilling the seller's obligations as defined by the purchase order agreement; and, electronically evaluating whether the seller has complied with the seller's obligations as defined by the purchase order agreement.

In another embodiment, the invention provides a computerized method for facilitating transactions in goods or services. The method includes: allowing electronic procurement of a purchase order agreement between a seller and a buyer, the purchase order agreement being stored electronically and relating to a transaction in one or more goods or services, comprising allowing electronic negotiation between the seller and the buyer relating to establishing the purchase order agreement; means for allowing electronic modification of the purchase order agreement upon agreement by the seller and the buyer to the modification; receiving and storing electronic evidence that the seller has performed in connection with fulfilling the seller's obligations as defined by the purchase order agreement; electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement as modified by any modifications.

In another embodiment, the invention provides a computer usable medium storing program code which, when executed on a computerized device, causes the computerized device to execute a method for facilitating transactions in goods or services. The method includes: allowing electronic procurement of a purchase order agreement between a seller and a buyer and relating to a transaction in one or more goods or services, and electronically storing the purchase order agreement; allowing electronic modification of the purchase order agreement upon agreement by the seller and the buyer to the modification; receiving and storing electronic evidence that the seller has performed in connection with fulfilling the seller's obligations as defined by the purchase order agreement as modified by any modifications; electronically evaluating whether the seller has complied with the seller's obligations as defined by the purchase order agreement as modified by any modifications; electronically providing a payment instruction if the seller has been evaluated to have complied with the seller's obligations as defined by the purchase order agreement as modified by any modifications; and, receiving and storing electronic evidence that the buyer has made one or more payments in connection with fulfilling buyer's obligations as defined by the purchase order agreement as modified by any modifications.

In another embodiment, the invention provides a computer usable medium storing program code which, when executed on a computerized device, causes the computerized device to execute a method for facilitating transactions in goods or services. The method includes: allowing electronic procurement of a purchase order agreement between a seller and a buyer and relating to a transaction in one or more goods or services, comprising allowing electronic negotiation between the seller and the buyer relating to establishing the purchase order agreement, and electronically storing the purchase order agreement; allowing electronic modification of the purchase order agreement upon agreement by the seller and the buyer to the modification receiving and storing electronic evidence that the seller has performed in connection with fulfilling the seller's obligations as defined by the purchase order agreement; electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement as modified by any modifications.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for evaluating the buyer's cumulative credit exposure at at least one particular time, based upon buyer transaction activity information stored within the system; means for receiving and storing electronic evidence that the seller has performed in connection with fulfilling the seller's obligations as defined by the purchase order agreement; and, means for electronically evaluating whether the seller has complied with the seller's obligations as defined by the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for evaluating the buyer's cumulative credit exposure at at least one particular time, based upon buyer transaction activity information stored within the system; means for receiving and storing electronic evidence that the seller has performed in connection with fulfilling the seller's obligations as defined by the purchase order agreement; means for electronically evaluating whether the seller has complied with the seller's obligations as defined by the purchase order agreement; means for electronically providing a payment instruction if the seller has been evaluated to have complied with the seller's obligations as defined by the purchase order agreement; and, means for receiving and storing electronic evidence that the buyer has made one or more payments in connection with fulfilling buyer's obligations as defined by the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; evaluating the buyer's cumulative credit exposure at at least one particular time, based upon buyer transaction activity information stored within the system; receiving and storing electronic evidence that the seller has performed in connection with fulfilling the seller's obligations as defined by the purchase order agreement; and, electronically evaluating whether the seller has complied with the seller's obligations as defined by the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; evaluating the buyer's cumulative credit exposure at at least one particular time, based upon buyer transaction activity information stored within the system; receiving and storing electronic evidence that the seller has performed in connection with fulfilling the seller's obligations as defined by the purchase order agreement; and, electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement.

In another embodiment, the invention provides a computer usable medium storing program code which, when executed on a computerized device, causes the computerized device to execute a computerized method for facilitating transactions in goods or services. The method includes: allowing electronic procurement of a purchase order agreement between a seller and a buyer and relating to a transaction in one or more goods or services, and electronically storing the purchase order agreement; evaluating the buyer's cumulative credit exposure at at least one particular time, based upon buyer transaction activity information stored within the system; receiving and storing electronic evidence that the seller has performed in connection with fulfilling the seller's obligations as defined by the purchase order agreement; electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for electronically providing an opportunity for the seller to obtain financing in relation to producing the one or more goods or services; means for receiving and storing electronic evidence that the seller has performed in connection with fulfilling the seller's obligations as defined by the purchase order agreement; and, means for electronically evaluating whether the seller has complied with the seller's obligations as defined by the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for receiving and storing electronic evidence that the seller has performed in connection with fulfilling the seller's obligations as defined by the purchase order agreement; means for electronically evaluating whether the seller has complied with the seller's obligations as defined by the purchase order agreement; and, means for electronically providing an opportunity for the seller to obtain advance payment in relation to the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for electronically providing an opportunity for the seller to obtain financing in relation to the one or more goods; means for receiving and storing electronic evidence that the seller has performed in connection with fulfilling the seller's obligations as defined by the purchase order agreement; means for electronically evaluating whether the seller has complied with the seller's obligations as defined by the purchase order agreement; means for electronically providing a payment instruction if the seller has been evaluated to have complied with the seller's obligations as defined by the purchase order agreement; and, means for receiving and storing electronic evidence that the buyer has made one or more payments in connection with fulfilling buyer's obligations as defined by the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for receiving and storing electronic evidence that the seller has performed in connection with fulfilling the seller's obligations as defined by the purchase order agreement; means for electronically evaluating whether the seller has complied with the seller's obligations as defined by the purchase order agreement; means for electronically providing an opportunity for the seller to obtain advance payment in relation to the purchase order agreement; means for electronically providing a payment instruction if the seller has been evaluated to have complied with the seller's obligations as defined by the purchase order agreement; and, means for receiving and storing electronic evidence that the buyer has made one or more payments in connection with fulfilling buyer's obligations as defined by the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; electronically providing an opportunity for the seller to obtain financing in relation to the one or more goods or services; receiving and storing electronic evidence that the seller has performed in connection with fulfilling the seller's obligations as defined by the purchase order agreement; and, electronically evaluating whether the seller has complied with the seller's obligations as defined by the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; receiving and storing electronic evidence that the seller has performed in connection with fulfilling the seller's obligations as defined by the purchase order agreement; electronically evaluating whether the seller has complied with the seller's obligations as defined by the purchase order agreement; and, means for electronically providing an opportunity for the seller to obtain advance payment in relation to the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; electronically providing an opportunity for the seller to obtain financing in relation to the one or more goods or services; receiving and storing electronic evidence that the seller has performed in connection with fulfilling the seller's obligations as defined by the purchase order agreement; electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement.

In another embodiment, the invention provides a computer usable medium storing program code which, when executed on a computerized device, causes the computerized device to execute a computerized method for facilitating transactions in goods or services. The method includes: allowing electronic procurement of a purchase order agreement between a seller and a buyer and relating to a transaction in one or more goods or services, and electronically storing the purchase order agreement; receiving and storing electronic evidence that the seller has performed in connection with fulfilling the seller's obligations as defined by the purchase order agreement; electronically evaluating whether the seller has complied with the seller's obligations as defined by the purchase order agreement; electronically providing an opportunity for the seller to obtain advance payment in relation to the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for receiving and storing electronic evidence that the seller has performed in connection with fulfilling the seller's obligations as defined by the purchase order agreement; means for electronically providing an opportunity for at least one of the seller and the buyer to obtain, through the system, cargo insurance relating to the one or more goods or services to insure against risk of loss in connection with shipment of the one or more goods or services in accordance with the transaction; and, means for electronically evaluating whether the seller has complied with the seller's obligations as defined by the purchase order agreement.

In another embodiment, the invention provides a computerized system for facilitating transactions in goods or services. The system includes: means for allowing electronic procurement of a purchase order agreement between a seller and a buyer and relating to a transaction in one or more goods or services, and for electronically storing the purchase order agreement; means for receiving and storing electronic evidence that the seller has performed in connection with fulfilling the seller's obligations as defined by the purchase order agreement; means for electronically providing an opportunity for at least one of the seller and the buyer to obtain, through the system, cargo insurance relating to the one or more goods or services to insure against risk of loss in connection with shipment of the one or more goods or services in accordance with the transaction; means for electronically evaluating whether the seller has complied with the seller's obligations as defined by the purchase order agreement; means for electronically providing a payment instruction if the seller has been evaluated to have complied with the seller's obligations as defined by the purchase order agreement; and, means for receiving and storing electronic evidence that the buyer has made one or more payments in connection with fulfilling buyer's obligations as defined by the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; receiving and storing electronic evidence that the seller has performed in connection with fulfilling the seller's obligations as defined by the purchase order agreement; electronically providing an opportunity for at least one of the seller and the buyer to obtain, through the system, cargo insurance relating to the one or more goods or services to insure against risk of loss in connection with shipment of the one or more goods or services in accordance with the transaction; and, electronically evaluating whether the seller has complied with the seller's obligations as defined by the purchase order agreement.

In another embodiment, the invention provides a computerized method for facilitating transactions in goods or services. The method includes: allowing electronic procurement of a purchase order agreement between a seller and a buyer and relating to a transaction in one or more goods or services, and electronically storing the purchase order agreement; receiving and storing electronic evidence that the seller has performed in connection with fulfilling the seller's obligations as defined by the purchase order agreement; electronically providing an opportunity for at least one of the seller and the buyer to obtain, through the system, cargo insurance relating to the one or more goods or services to insure against risk of loss in connection with shipment of the one or more goods or services in accordance with the transaction; electronically evaluating whether the seller has complied with the seller's obligations as defined by the purchase order agreement; electronically providing a payment instruction if the seller has been evaluated to have complied with the seller's obligations as defined by the purchase order agreement; and, receiving and storing electronic evidence that the buyer has made one or more payments in connection with fulfilling buyer's obligations as defined by the purchase order agreement.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

Figure 1:
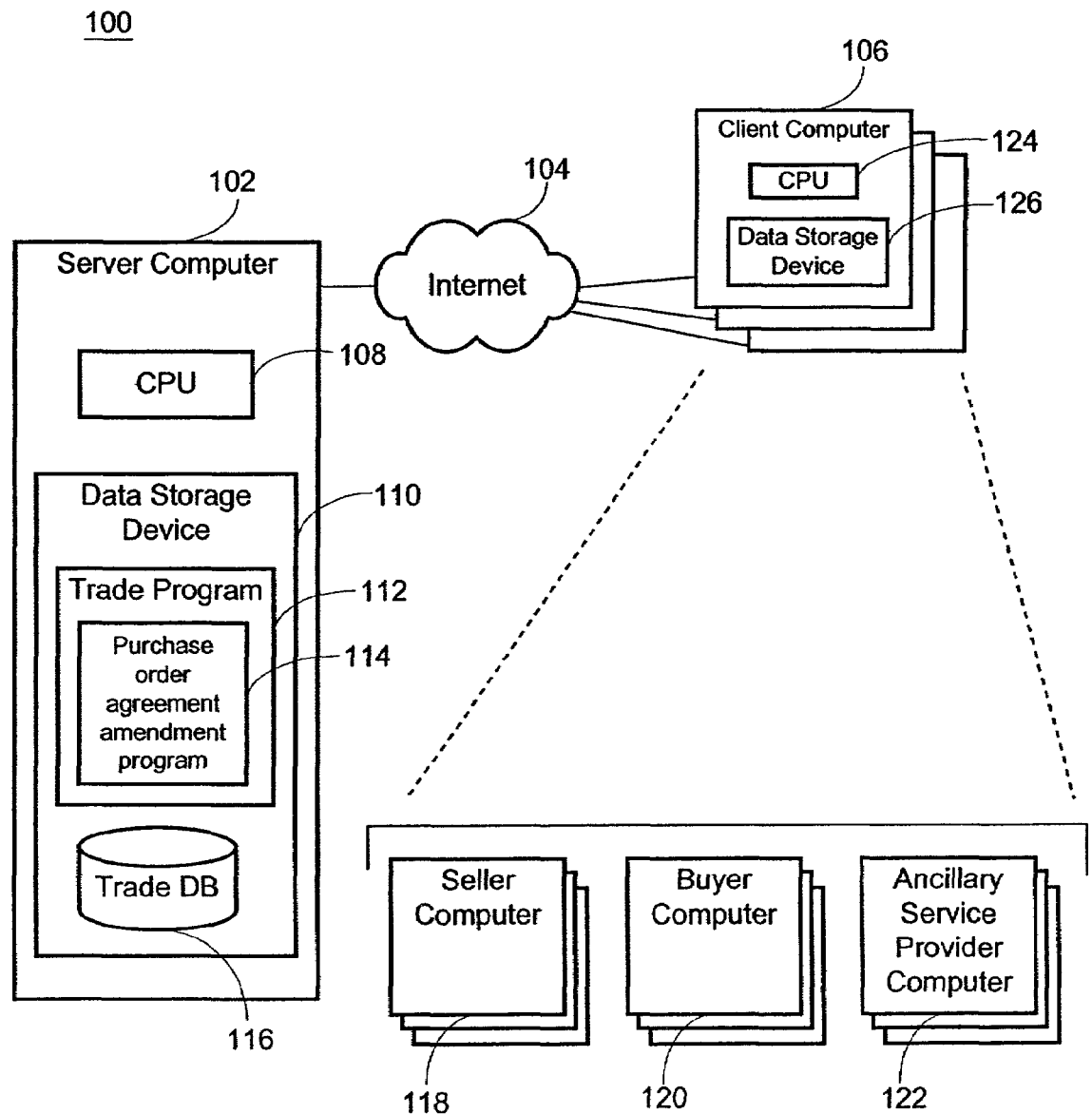
FIG. 1 is a block diagram of a distributed computer system according to one embodiment of the invention, depicting a server computer having a purchase order agreement amendment program.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

The present invention provides a comprehensive, integrated, multi-featured electronic trading system capable of facilitating transactions, including initial or early stages of a transaction, such as a proposed purchase order, through to later or final stages, such as payment on an invoice or invoices relating to the transaction.

In one embodiment, the system allows sellers or buyers to propose amendments and counter-amendments to, and to amend, through mutual agreement, a purchase order agreement. Any amendments are accounted for in later aspects of the transaction facilitated by the system. In another embodiment, the system, utilizing transaction information stored by the system, monitors present and anticipated future credit exposures of buyers, and utilizes the buyer credit exposure information for purposes including facilitating providing buyer credit assurance to sellers. In another embodiment, the system facilitates sellers obtaining financing or advance payment relating to transactions. In another embodiment, the system provides opportunities for sellers or buyers to obtain cargo insurance on goods or services shipped in accordance with transactions.

The present application is related to previously incorporated by reference and commonly assigned U.S. Pat. No. 5,717,989, issued on Feb. 10, 1998 and entitled, "FULL SERVICE TRADE SYSTEM," to previously incorporated by reference and commonly assigned U.S. Pat. No. 6,151,588, issued on Nov. 21, 2000 and entitled, "FULL SERVICE TRADE SYSTEM," and to commonly assigned U.S. application Ser. No. 09/536,190, filed on Mar. 27, 2000 and entitled, "FULL SERVICE TRADE SYSTEM," hereinafter collectively referred to as the "Full Service Trade System Patents and Application." The trade system disclosed in the Full Service Trade System Patents and Applications is hereinafter referred to as the Full Service Trade System. The stages of a transaction, as disclosed in the Full Service Trade System Patents and Application, can be roughly broken down into a number of stages.

The four stages can be termed procurement, fulfillment, compliance, and settlement, and all are facilitated electronically through the disclosed trade system, with data stored electronically. Procurement may begin with a proposed purchase order, may include a negotiation process between a potential buyer and a potential seller, and may end with a purchase order agreement specifying terms of the transaction and being agreed to by both parties. Fulfillment represents the stage in which the seller fulfills the seller's obligations under the purchase order agreement. Fulfillment may begin with the creation of the purchase order agreement and may end when the seller creates an invoice document specifying shipped goods and required payment. The fulfillment stage may also include a logistics service provider producing a proof of delivery document such as a waybill, and an inspection service provider producing an inspection certificate. Compliance begins when all required fulfillment documents have been completed. During compliance, various ones of the electronic documents, such as the purchase order agreement and the invoice, are compared against each other, and discrepancies are noted. The buyer may be notified of discrepancies, which are to be waived by the buyer or resolved with the seller. The settlement stage is the stage in which one or more payment instructions may be provided to the buyer by the trade system. Also during settlement, payment may be made according to the terms of the transaction, whether within or outside of the trade system, and the trade system may store information indicating that payment has been made and the amount of payment. All of these stages may be facilitated electronically by embodiments of the Full Service Trade System, and the present invention is described with reference to trade system functionality as disclosed in the Full Service Trade System Patent and Applications.

In some embodiments of the present invention, a feature of some embodiments of the Full Service Trade System is incorporated, the feature comprising the ability of the Full Service Trade System to, under appropriate conditions, provide a payment guarantee to a seller to guarantee payment by a buyer in connection with a purchase order agreement. This feature is described in detail in the Full Service Trade System Patents and Application. For example, in some embodiments, the system comprises means for evaluating whether a first set of payment guarantee criteria are met, and means for, if the first set of payment guarantee criteria are evaluated to be met, the system providing a payment guarantee to the seller to guarantee payment by the buyer in connection with the purchase order agreement. Numerous examples of criteria, which may be stored in a trade database accessible by the system, are disclosed, and include qualifications of the seller of the buyer stored in the system, the credit exposure of the buyer being within a specified acceptable limit, and the seller being evaluated by the system to have complied with the seller's obligations as defined by the purchase order agreement.

FIG. 1 is a block diagram of a distributed computer system 100 according to one embodiment of the invention, depicting a server computer 102 having a purchase order agreement amendment program 114. In the computer system depicted in FIG. 1, a server computer 102 is connected to a plurality of client computers 106 via the Internet 104. While only one server computer is shown, the invention contemplates embodiments having multiple server computers. While the server computer 102 and the client computers 106 are shown as connected via the Internet 104, the invention also contemplates connection via other types of networks and arrays of networks, including one or more wide area networks or one or more local area networks, and the invention contemplates embodiments in which no connection to the Internet 104 is provided.

Each of the client computers 106 comprises one or more central processing units (CPUs) 124 as well as one or more data storage devices 126 which may include one or more Internet browser programs. The plurality of client computers 106 comprise one or more seller computers 118, one or more buyer computers 120, and may comprise one or more ancillary service provider computers 122 for ancillary service providers such as guarantors, insurers, and shippers.

The server computer 102 comprises one or more CPUs 108, one or more data storage devices 110, and a trade database. The data storage devices 110, 126 may comprise various amounts of RAM, for storing computer programs and other data. In addition, the server computer 102 and the client computers 106 may include other components typically found in computers, including one or more output devices such as monitors, other fixed or removable data storage devices such as hard disks, floppy disk drives, and CD-ROM drives, and one or more input devices such as mouse pointing devices and keyboards. Generally, the server computer 102 and the client computers 106 operate under and execute computer programs under the control of an operating system, such as Windows, Macintosh, UNIX, etc.

The data storage device 110 of the server computer 102 comprises a trade program 112 comprising a trade database 116 and a purchase order agreement amendment program 114. As shown in FIG. 1, the trade database 116 is included within the server computer 102, but embodiments are contemplated in which the trade database 116 is located elsewhere and accessible by the server computer 102. The trade program 112 and trade database 116 are intended to include, but not be limited to including, all of the programming and data for carrying out, in various embodiments, some or all of the functions of the Full Service Trade System, as summarized broadly above with regard to the stages of a transaction, and as disclosed in greater detail in the Full Service Trade System Patent and Applications. The purchase order agreement amendment program 114 is intended to represent programming necessary, within the trade program 114, for carrying out purchase order agreement amendment functions, as described in detail below, and the trade database 116 is intended to include all of the data necessary for carrying out purchase order agreement amendment functions. Although the purchase order agreement amendment program 114 is depicted conceptually as a unit within the trade program 112, it is to be understood that the purchase order agreement amendment program 114 may comprise programming that is incorporated as part of the programming of the trade program 112 itself, or may be a modular component thereof.

Figure 2:
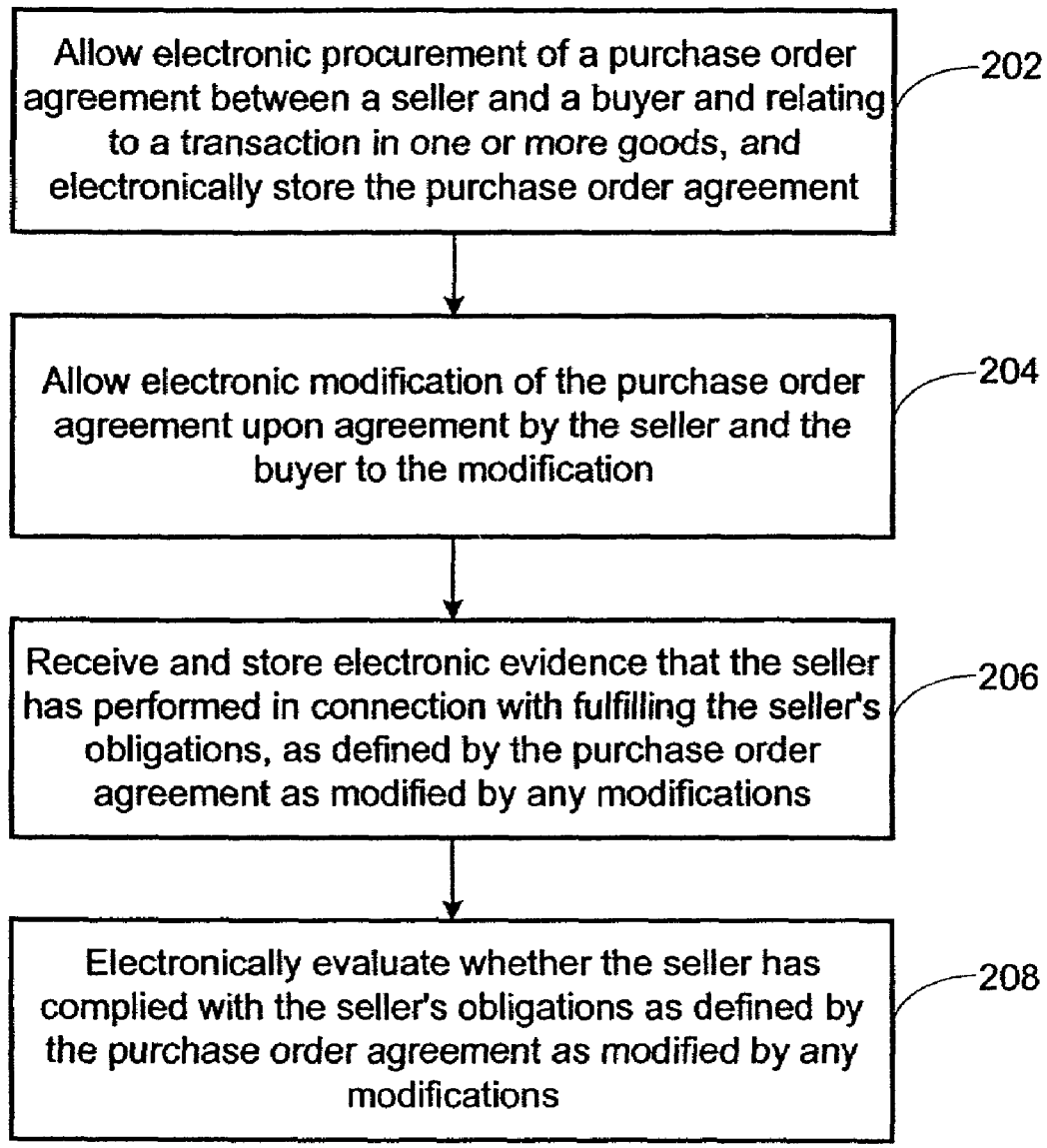
FIG. 2 is a flow diagram depicting a trade method according to one embodiment of the invention, including allowing a seller or buyer to amend a purchase order agreement.

FIG. 2 is a flow diagram depicting a trade method 200 according to one embodiment of the invention, including allowing a seller or buyer to amend a purchase order agreement. As indicated above, a purchase order agreement is an electronic document that specifies terms of a transaction and is agreed to by a buyer and a seller. The purchase order agreement defines the obligations of the seller and the buyer with respect to the transaction, and may include a type of good or goods to be purchased, an amount of goods, price of the goods, and various other information. The purchase order agreement may arise from negotiations between the seller and the buyer relating to one or more proposed purchase order agreements proposed through the system by the buyer or the seller.

Method 200 represents a purchase order agreement amendment function incorporated as part of an electronic trade method. At step 202, the trade program 112 allows electronic procurement of a purchase order agreement between the seller and the buyer and relating to a transaction in one or more goods, and electronically stores the purchase order agreement in the trade database 116. It is to be understood that, while the invention is described primarily with reference to transactions in goods, the invention is also applicable to transactions in services, or transactions in goods and services. Step 202 comprises the system 100 performing procurement stage functions, as disclosed in detail in the Full Service Trade System Patents and Applications. A seller and a buyer may be referred to hereinafter as the "transacting parties." Step 202 may involve negotiation between the transacting parties to arrive at the mutually agreed upon purchase order agreement, which negotiation may include the parties electronically communicating to each other proposed purchase orders, counter-proposals, etc. similar to and discussed with reference to the negotiation process described below with reference to FIG. 4.

At step 204, the trade program 112, utilizing the purchase order agreement amendment program 114, allows electronic modification of the purchase order agreement upon agreement by the seller and the buyer to the modification. Step 204 is intended to include any negotiation between the seller and the buyer with regard to the modifications (as described with reference to FIG. 4). Once modified, the purchase order agreement as modified is utilized throughout the remainder of the method 200. Steps 202 and 204 comprises the system 100 performing procurement stage functions, as disclosed in detail in the Full Service Trade System Patents and Applications.

At step 206, the trade program 112 receives and stores in the trade database 116 electronic evidence that the seller has performed in connection with fulfilling the seller's obligations as defined by the purchase order agreement as modified by any modifications. This step may represent the seller or other party entering in data to be stored in the trade database 116, such as electronic forms or documents, indicating or proving that the seller has shipped goods to the buyer, the type and quantity of the goods, etc. Step 206 comprises the system 100 performing fulfillment stage functions, as disclosed in detail in the Full Service Trade System Patents and Applications.

At step 208, the trade program 112 electronically evaluates whether the seller has complied with the seller's obligations as defined by the purchase order agreement as modified by any modifications. Step 208 represents the trade program 112 performing compliance stage functions, as described above, including comparing the purchase order agreement to the invoice, etc., but with the trade program 112 utilizing the purchase order agreement as modified by any modifications.

While steps 206 and 208 are described with reference to the seller complying the seller's obligations, it is to be understood that this may include, in some embodiments, the seller complying with a portion of the seller's obligations, such as by making a partial shipment of goods.

Figure 3:
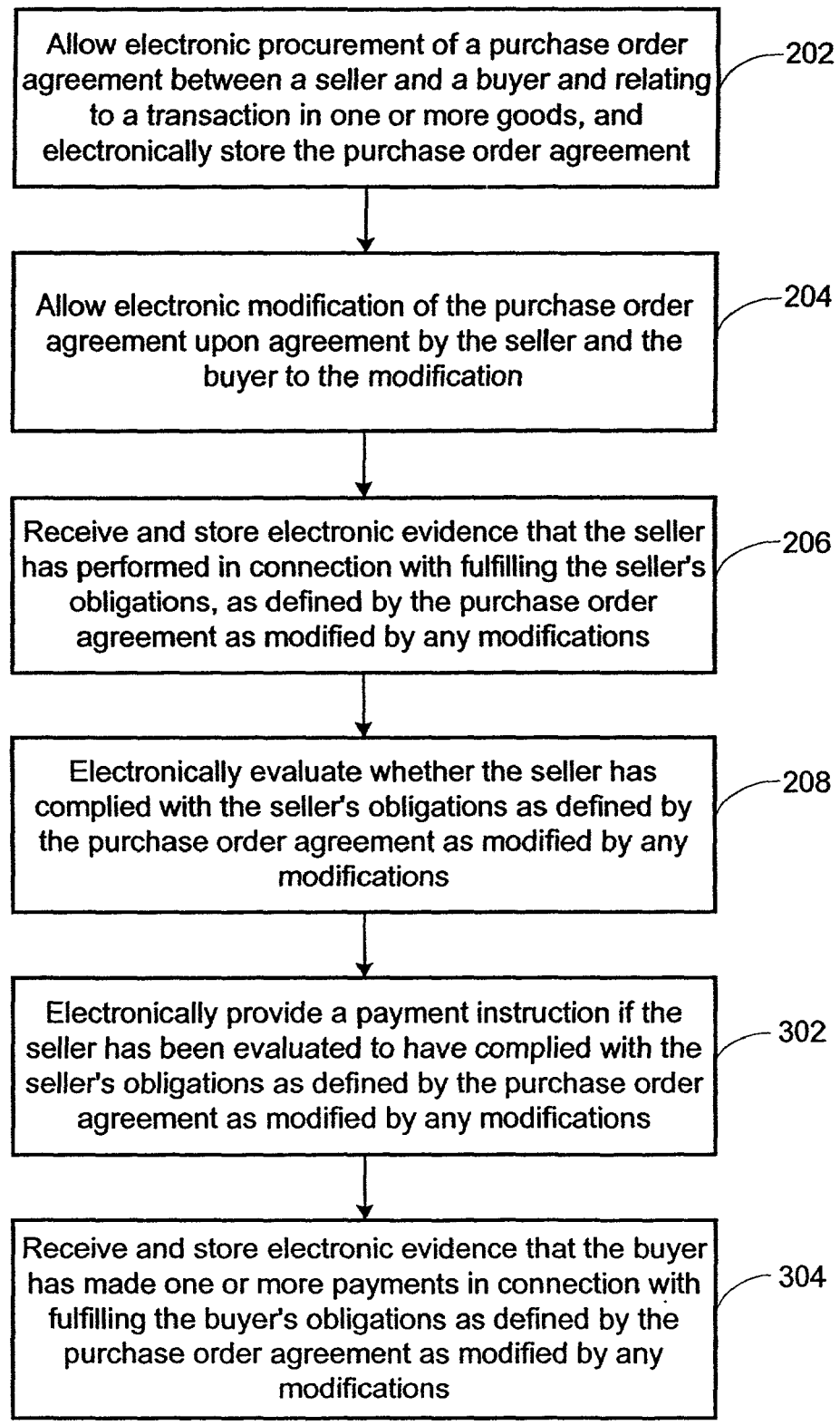
FIG. 3 is a flow diagram depicting a trade method according to one embodiment of the invention, including allowing a seller and a buyer to amend a purchase order agreement and including providing a payment instruction and receiving evidence of payment by the buyer.

FIG. 3 is a flow diagram depicting a trade method 300 according to one embodiment of the invention, including allowing a seller and a buyer to amend a purchase order agreement and including providing a payment instruction and receiving evidence of payment by the buyer. Steps 202 through 208 are described in detail above.

At step 302, the trade program 112 electronically provides a payment instruction if the seller has been evaluated to have complied with the seller's obligations as defined by the purchase order agreement as modified by any modifications. For example, step 302 may comprise the system 100 sending an electronic message such as an e-mail message to the buyer to indicate to the buyer that the seller has complied with the seller's obligations and that payment is due from the buyer by the date specified in the purchase order agreement.

At step 304, the trade program 112 receives and stores in the trade database 116 electronic evidence that the buyer has made one or more payments in connection with fulfilling the buyer's obligations as defined by the purchase order agreement as modified by any modifications. Step 304 may comprise the buyer or another party electronically entering in to the system 100, through an electronic form or otherwise, that a payment has been made, the amount of the payment, the date of payment, etc. Step 304 comprise the system 100 performing settlement stage functions, as disclosed in detail in the Full Service Trade System Patents and Applications, but utilizing the purchase order agreement as modified by any modifications.

Figure 4:
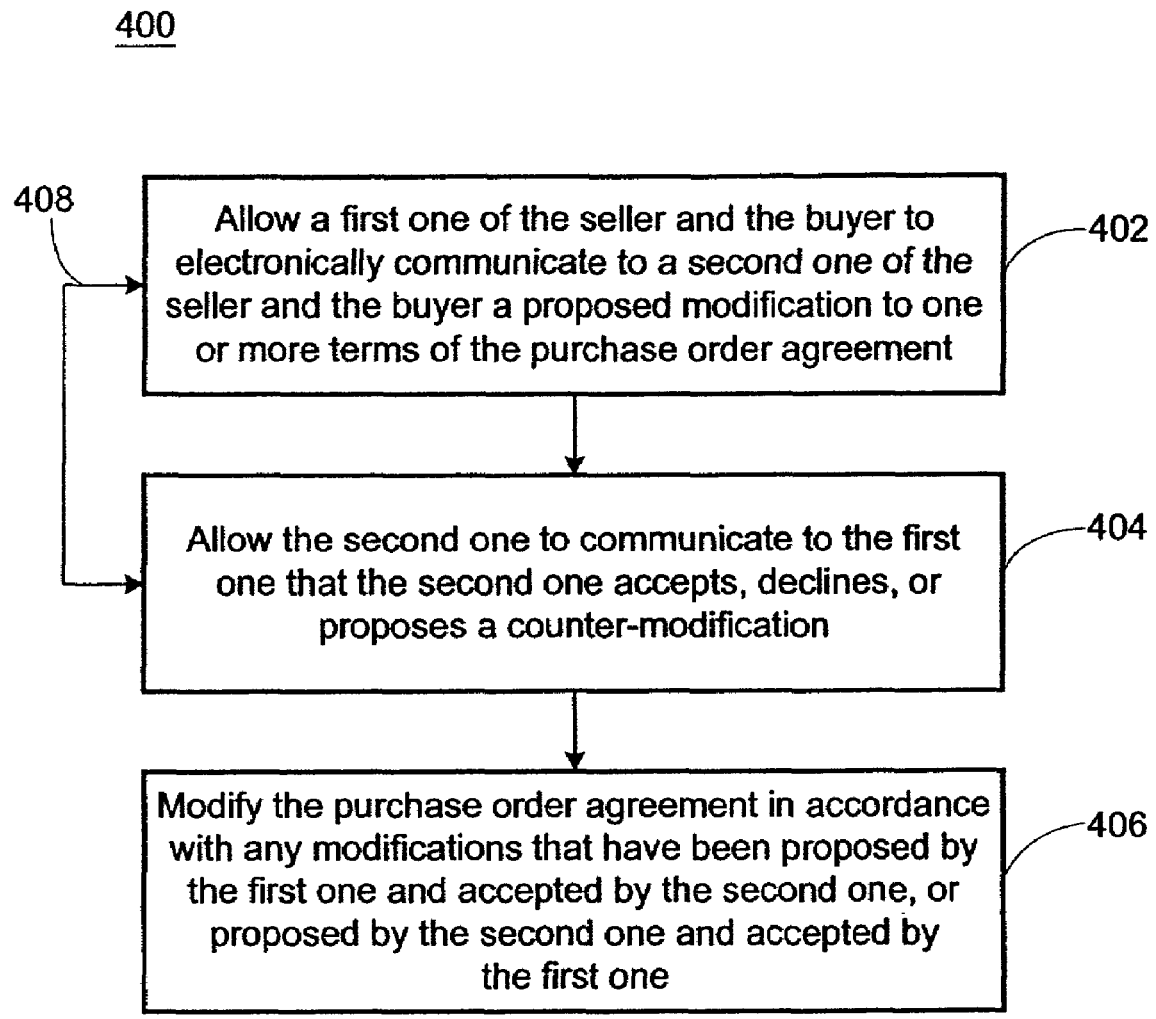
FIG. 4 is a flow diagram depicting a method for negotiation of amendment to a purchase order agreement, according to one embodiment of the invention.

FIG. 4 is a flow diagram depicting a method 400 for negotiation of amendment to a purchase order agreement, according to one embodiment of the invention. In some embodiments of the invention, the method 400 depicted in FIG. 4 represents a part of step 204, as described above with reference to FIGS. 2-3.

The method 400 begins after the purchase order agreement has been established by agreement of the transacting parties. At step 402, the trade program 112 allows a first transacting party to electronically communicate to a second transacting party a proposed modification to one or more terms of the purchase order agreement. For example, step 402 may comprise the first transacting party electronically indicating a proposed modification or modifications to the purchase order agreement, such as changing the price term, the quantity, the payment due date, the shipment by date, etc., or several thereof. For example, the proposed changing could be indicted by strike-outs, bold face type, etc., on an electronic representation of the purchase order agreement. Such changes are merely proposed changes, however, unless accepted by the second transacting party.

At step 404, the trade program 112 allows the second transacting party to electronically communicate to the first transacting party that the second transacting party accepts the proposed modifications, declines the proposed modifications, or proposes a counter modification. A counter-modification may take the form of additional strike-outs, etc., to the communication from the first transacting party, or may be proposed changes entirely unrelated to the first transacting party's proposal or communicated entirely separately therefrom. Arrow 408 is intended to indicate that the negotiation process described in steps 402 and 404 can repeat any number times, with different transacting parties proposing different proposals and counterproposals, and with potentially multiple agreed-to modifications.

At step 406, the trade program 112 modifies the purchase order agreement to incorporate any modifications that have been proposed by one transacting party and accepted by the other transacting party. Step 406 comprises the trade program 112 incorporating any number of modifications that have been agreed to in this fashion.

The result of method 400 is a negotiation process through which the seller and the buyer may modify, through mutual agreement, an electronic purchase order agreement. This provides the transacting parties with an important feature to be utilized within the system 100. Additionally, the transacting parties can count on the system 100 utilizing the modified purchase order agreement in any and all later stages of the transaction facilitated by the system 100.

In another embodiment of the invention, a negotiation process similar to that described with reference to FIG. 4 may be utilized also in a process of negotiating and establishing the purchase order agreement. For example, in such embodiments, the transacting parties can communicate proposed purchase orders and counter-proposals, until mutually agreeing upon and establishing the purchase order agreement.

In some embodiments of the invention, the trade program 112 causes an electronic audit trail to be stored in the trade database 116. For example, an audit trail may indicate proposed modifications, counter-proposals, declinations of proposed modifications, and acceptances of proposed modifications, for later reference. The audit trail may include details such as the exact modification proposed, declined, or accepted, the date, time, and the chronological order of the proposals, declinations, or acceptances, thus providing an accurate account of the history of the purchase order agreement and its evolution through negotiation. The audit trail may even indicate a person or group within a transacting party's organization that was responsible for the action, by, for example, the system 100 requiring that the party taking the action electronically sign the communication. The audit trail may later be accessed by one or both of the transacting parties, or by another entity, for example, to aid in dispute resolution. In some embodiments, a similar audit trail relating to proposed purchase orders is stored for later reference.

In some embodiments of the invention, different people or groups within a transacting party's organization have different rights with regard to proposing, declining, or accepting modifications, and the rights may, for example, be assigned through the system 100 by a system administrator within the transacting party's organization.

The trade program 112 automatically checks attempted proposed modifications and refreshes electronic documents, so that, if the proposed modification has implications requiring further information or causes inconsistencies, the party attempting to make the proposed modification must clarify, add required additional information, or abandon the proposed modification, as appropriate. For example, changing a transacting party responsible for inspection of goods may require entry of a selected inspector, without which selection the trade program 112 will not allow the proposed modification. Additionally, the trade program 112 may refresh other electronic forms and documents related to the transaction when proposed modification to the purchase order is made, to reflect the proposed modification, and again may require any necessary clarification or additional information before allowing the proposal. Any modifications that actually occur to the purchase order agreement are reflected by making any corresponding changes to other affected forms, documents, or other data. The process of document checking in the above-described manner is sometimes referred to as document validation.

Figure 5:
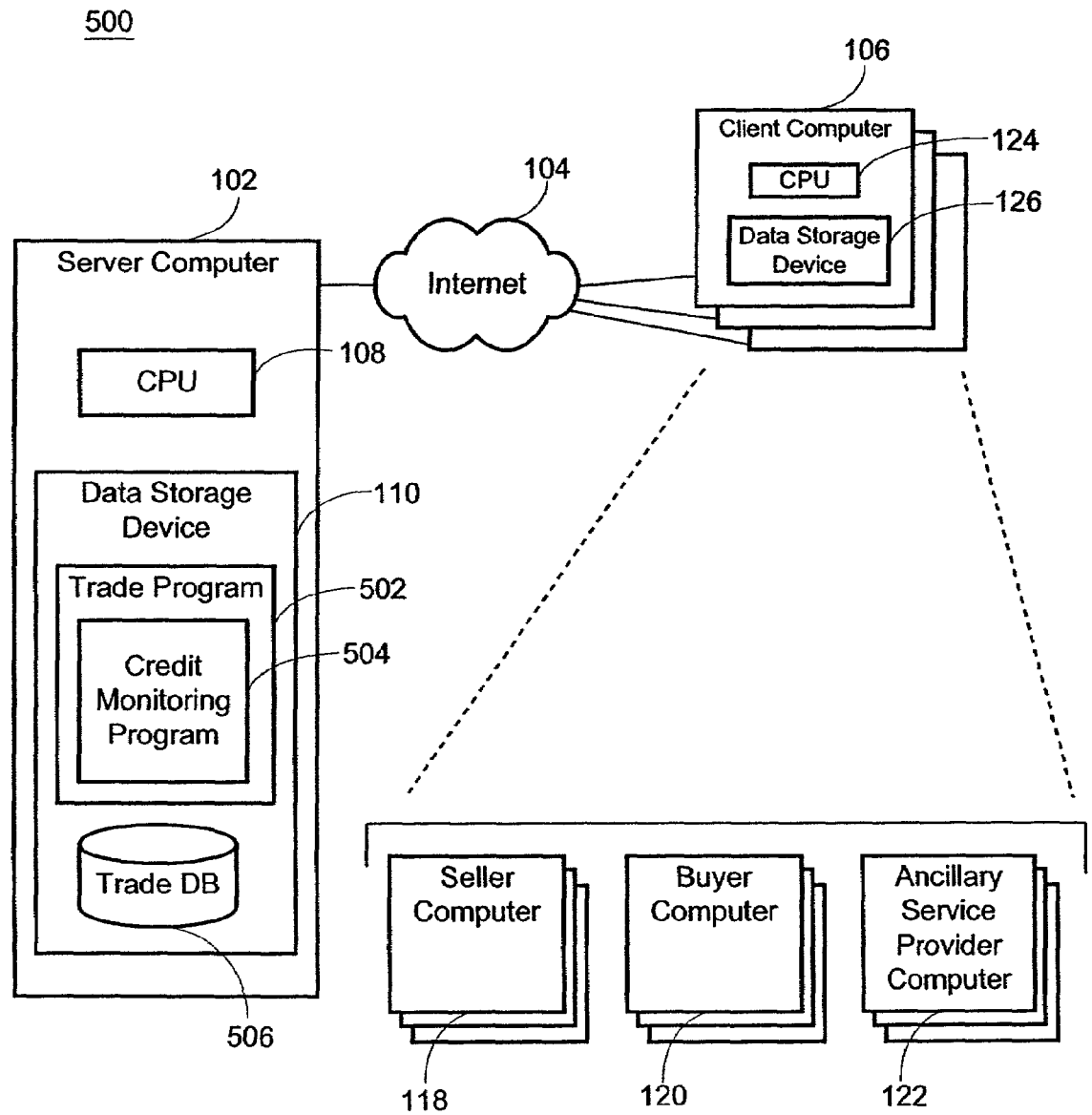
FIG. 5 is a block diagram of a distributed computer system according to one embodiment of the invention, depicting a server computer having a credit monitoring program.

FIG. 5 is a block diagram of a distributed computer system 500 according to one embodiment of the invention, depicting a server computer 102 having a credit monitoring program 504. Many components of the system 500 of FIG. 5 have been previously described with reference to system 100 FIG. 1.

The trade program 502 and trade database 506 are intended to include, but not be limited to including, all of the programming and data for carrying out, in various embodiments, some or all of the functions of the Full Service Trade System, as summarized broadly above with regard to the stages of a transaction, and as disclosed in greater detail in the Full Service Trade System Patent and Applications. The credit monitoring program 504 is intended to represent programming necessary for credit monitoring functions, as described in detail below, and the trade database 506 is intended to include all of the data necessary for carrying out credit monitoring functions. Although the credit monitoring program 504 is depicted conceptually as a unit within the trade program 502, it is to be understood that the credit monitoring program 504 may comprise programming that is actually incorporated as part of the programming of the trade program 502 itself, or may be a modular component thereof.

Figure 6:
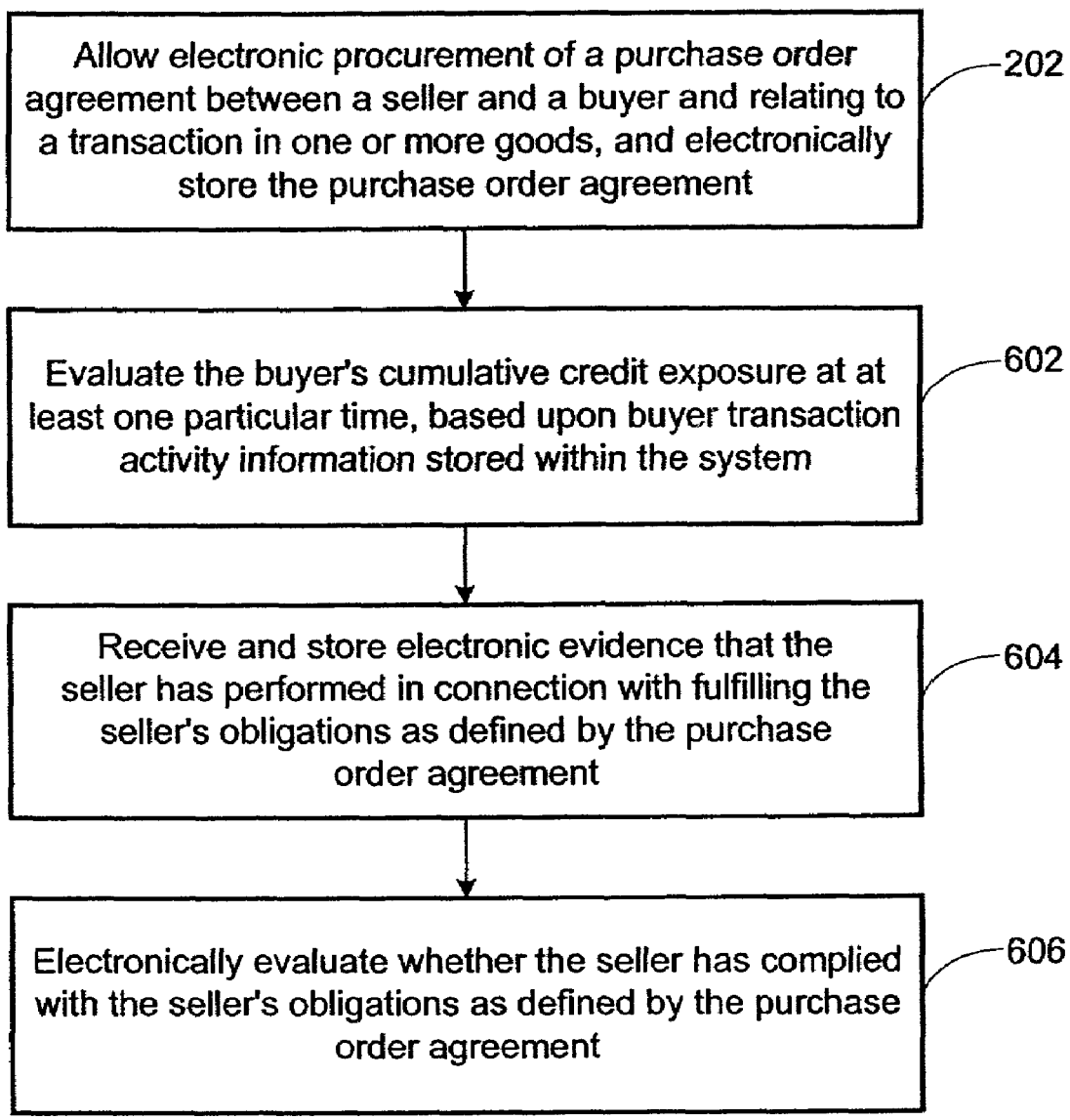
FIG. 6 is a flow diagram depicting a trade method according to one embodiment of the invention, including evaluating a buyer's cumulative credit exposure.

FIG. 6 is a flow diagram depicting a trade method 600 according to one embodiment of the invention, including evaluating a buyer's cumulative credit exposure.

Method 600 represents a credit monitoring function incorporated as part of an electronic trade method. At step 202, the trade program 502 allows electronic procurement of a purchase order agreement between the seller and the buyer and relating to a transaction in one or more goods, and electronically stores the purchase order agreement in the trade database 506. Step 202 comprises the system 500 performing procurement stage functions, as disclosed in detail in the Full Service Trade System Patents and Applications.

At step 602, the trade program 502, utilizing the credit monitoring program 504, evaluates the buyer's cumulative credit exposure at at least one particular time, based upon transaction activity information stored in the trade database 506.

At step 604, the trade program 502 receives and stores in the trade database 506 electronic evidence that the seller has performed in connection with fulfilling the seller's obligations as defined by the purchase order agreement. This step may represent the seller or other party entering in data to be stored in the trade database 116, such as electronic forms or documents, indicating or proving that the seller has shipped goods to the buyer, the type and quantity of the goods, etc. Step 604 comprises the system 500 performing fulfillment stage functions, as disclosed in detail in the Full Service Trade System Patents and Applications.

At step 606, the trade program 502 electronically evaluates whether the seller has complied with the seller's obligations as defined by the purchase order agreement. Step 606 represents the trade program 502 performing compliance stage functions, including comparing the purchase order agreement to the invoice, etc.

Figure 7:
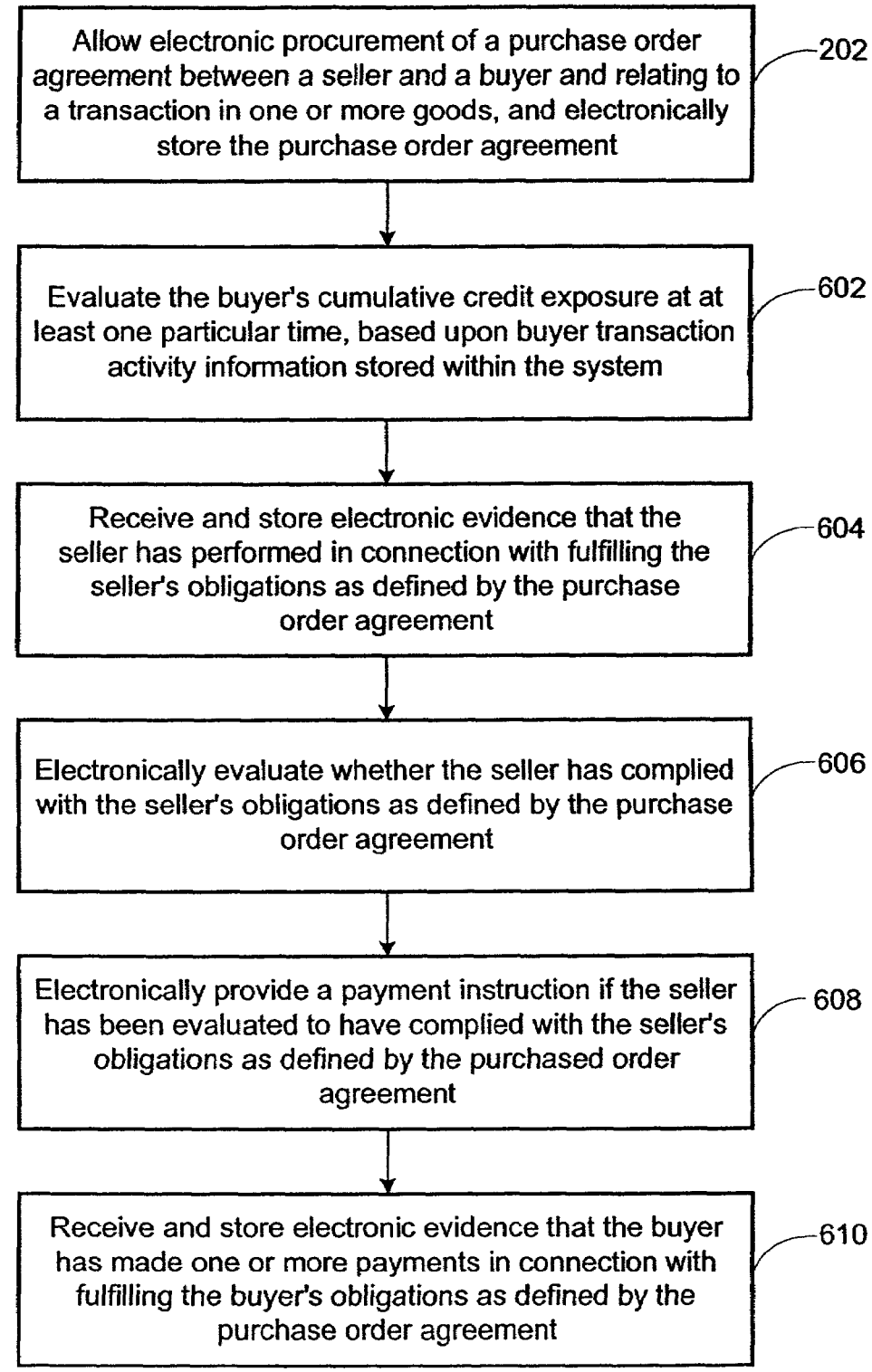
FIG. 7 is a flow diagram depicting a trade method according to one embodiment of the invention, including evaluating a buyer's cumulative credit exposure and including providing a payment instruction and receiving evidence of payment by the buyer.

FIG. 7 is a flow diagram depicting a trade method 700 according to one embodiment of the invention, including evaluating a buyer's cumulative credit exposure and including providing a payment instruction and receiving evidence of payment by the buyer.

Steps 202 through 606 are described above. Steps 608 and 610 comprise the system 500 performing settlement stage functions, as disclosed in detail in the Full Service Trade System Patents and Application. At step 608, the trade program 502 electronically provides a payment instruction if the seller has been evaluated to have complied with the seller's obligations as defined by the purchase order agreement. For example, step 608 may comprise the system 500 sending an electronic message such as an e-mail message to the buyer to indicate to the buyer that the seller has complied with the seller's obligations and that payment is due from the buyer by the date specified in the purchase order agreement.

At step 610, the trade program 502 receives and stores in the trade database 506 electronic evidence that the buyer has made one or more payments in connection with fulfilling the buyer's obligations as defined by the purchase order agreement. Step 610 may comprise the buyer or another party electronically entering in to the system 500, through an electronic form or otherwise, that a payment has been made, the amount of the payment, the date of payment, etc. Step 610 comprises the system 500 performing the settlement stage functions, as disclosed in detail in the Full Service Trade System Patents and Applications.

Figure 8:
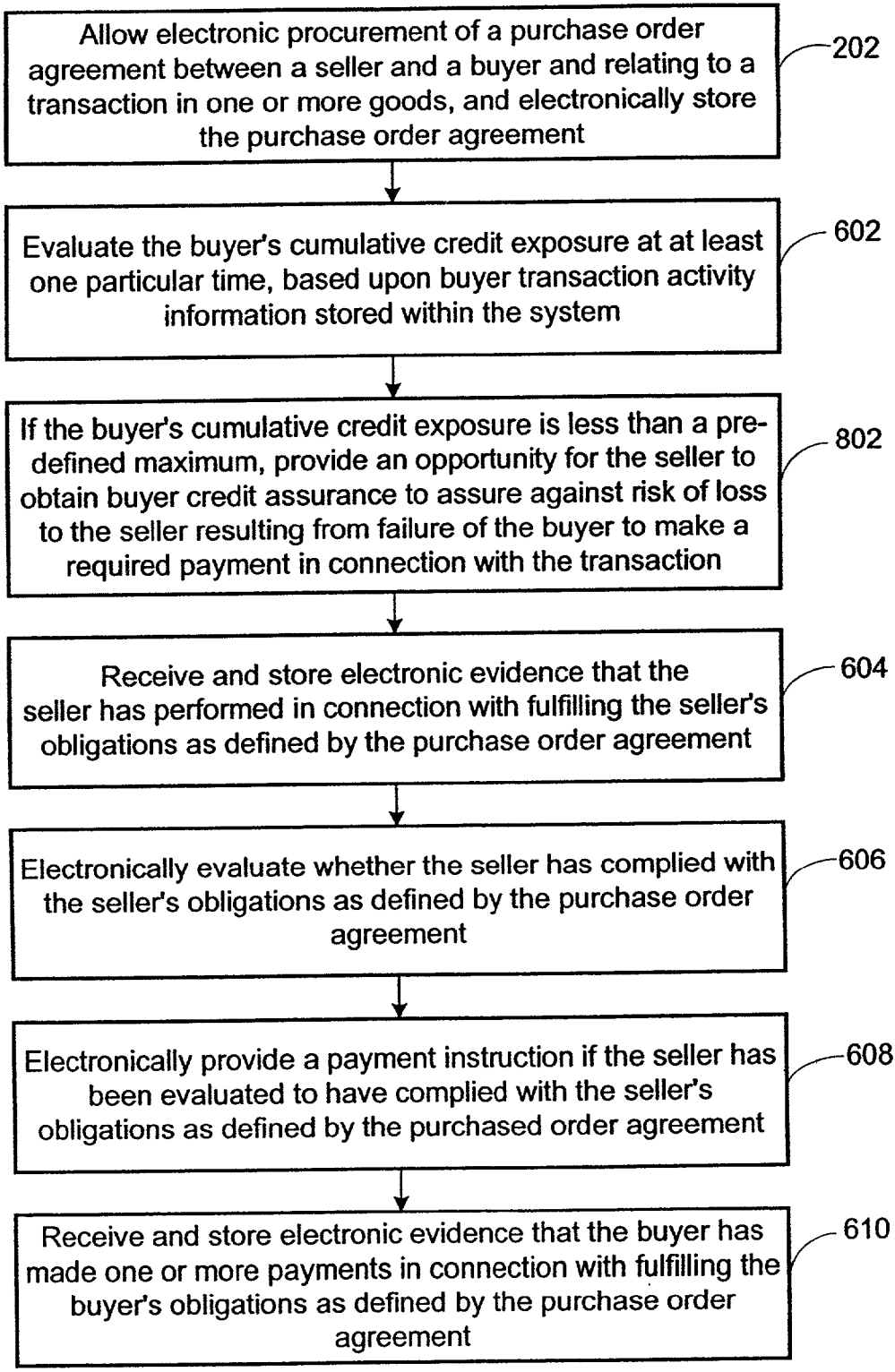
FIG. 8 is a flow diagram depicting a purchase order agreement amendment negotiation method according to one embodiment of the invention, including evaluating a buyer's cumulative credit exposure and conditionally providing an opportunity for the seller to obtain buyer credit assurance.

FIG. 8 is a flow diagram depicting a purchase order agreement amendment negotiation method 800 according to one embodiment of the invention, including evaluating a buyer's cumulative credit exposure and conditionally providing an opportunity for the seller to obtain buyer credit assurance.

Steps 202 and 602 are described above with reference to FIG. 7. At step 802, the system 500, if the buyer's cumulative credit exposure is less than a pre-defined maximum, provides an opportunity for the seller to obtain buyer credit assurance to assure against risk of loss to the seller resulting from failure of the buyer to make a required payment in connection with the transaction. Steps 604-610 are described above with reference to FIG. 7.

The trade database 506 may contain data relating to transactions and transaction activity between buyers and sellers, including, among other data, purchase order agreements, invoices, and settlement data. Utilizing data stored in the trade database, the trade program 502 can monitor, at any particular time or times, credit exposures of buyers. For example, purchase order agreements and invoices stored in the database may indicate payment obligations of buyers, including amount of payment required, and dates by which such payment obligations must be met. Further, settlement data may indicate whether any payments have been made in relation to the purchase order, and the amount of payment.

In some embodiments, the trade program 502, utilizing the credit monitoring program 504, may use this information to determine, for a particular buyer, at a particular time, the cumulative credit exposure of the buyer, by adding all invoices indicating payment obligations of the buyer, for which payment, or complete payment, has not yet been made, considering any payment information stored in the trade database 506. This ability, and related abilities of systems of the invention, are made possible due to the comprehensiveness of the system in facilitating all stages of transactions, and due to the comprehensiveness of the data contained in trade databases of the invention.

In addition to being able to monitor a buyer's cumulative credit exposure at any particular time, the trade program 502 can also monitor a buyer's anticipated credit exposure over a period of time. For example, a buyer may have an unpaid invoice with a payment due date two weeks in the future. In such an instance, the trade program 502 can monitor the buyer's anticipated credit exposure by utilizing the assumption that the buyer will make the payment on the due date. The buyer's credit exposure will thus be evaluated to drop on the payment due date by the amount of the payment. If the buyer, however, for example, makes payment one week before the payment due date, this indicates a drop in the buyer's credit exposure as of the payment date, which could not be anticipated prior to payment. However, since this data may be contained in the trade program 502, if the trade program 502 monitors the buyer's credit exposure after the payment date, the trade program 502 may utilize this data as indicating a drop in the buyer's credit exposure, prior to the payment due date. Further, in some embodiments, the trade program 504 periodically monitors the buyer's credit exposure, and updates present and anticipated credit exposures based upon such information.

As described above, by taking into account all transaction information for a buyer, the trade program 502 can monitor the buyer's cumulative credit exposure, sometimes called the buyer's envelope credit exposure. In addition, in some embodiments, the trade program 502 can monitor other types of credit exposures. For example, the trade program 504 can also monitor a cumulative credit exposure between the buyer and a particular seller. For example, certain purchase order agreements and invoices stored in the trade database may indicate transactions between the buyer and seller A, while others may indicate transactions between the buyer and sellers B, C, and D. By only taking into account transaction information pertaining to the buyer and seller A, the trade program can monitor the buyers relationship credit exposure with regard to seller A.

The various credit monitoring determinations and information can be useful in a variety of ways. The trade program 502 can communicate credit exposure to buyers, sellers, or others for informational purposes. For example, present and anticipated credit exposures may be communicated by the system in the form of a graphical display indicating credit exposure as a function of time.

Further, in some embodiments, credit monitoring information may be utilized in facilitating providing credit assurance for sellers through the system 500, which credit assurance may assure payment to a seller based on an obligation for the buyer to make the payment. Since, typically, a seller ships goods before a buyer pays for the goods, the seller may be at risk for the cost of the goods between the time of shipment and the time of payment. As such, credit assurance can put sellers at ease and thus lead to transactions taking place which otherwise might not.

Credit assurance may be provided to sellers, for example, by an assurer if certain conditions are met, which conditions can be determined by the system 500. One condition may be that the seller be evaluated by the system 500 as having complied with the seller's obligations as defined by a purchase order or an invoice. Other conditions may include the transaction to be assured being below a certain maximum buyer payment obligation, which is sometimes called a transaction limit, or a buyers relationship credit exposure with the seller or envelope credit exposures being equal to or beneath specified maximums, called relationship limits and envelope limits, respectively. The transaction, relationship, and envelope limits may be determined by the assurer and entered into and stored by the system 500, or may be determined by the system 500 itself based upon buyer or seller qualification information stored in the trade database 506.

Transactional, relationship, and envelope limits can serve a variety of purposes useful in determining whether to provide credit assurance. Exceeding an envelope limit can suggest that a buyer will not be able to make payment. Exceeding a relationship limit can suggest a high possibility of fraud being conducted by the particular seller and buyer together. A large individual transaction which exceeds a transactional limit can suggest a high possibility of fraud.

In some embodiments, credit assurance may be provided by the system 500 if, for a particular transaction, a buyer is within any limits. The cost of the credit assurance so provided may be included in fees charged to the seller or the buyer to utilize the system 500. For transactions exceeding limits, credit assurance may be unavailable, or may be available to within the limits only, or may be available above certain specified credit exposure measures only if additional fees are paid, or may be available above certain specified credit exposure measures up to a certain maximum only if additional fees are paid. Further, increments of assurance may be purchasable at different rates depending on how much additional assurance is desired. In some embodiments, various limits, maximums and rates can be based upon qualifications of the seller or the buyer stored in the trade database 506.

In some embodiments, the trade program 502 automatically monitors a buyer's credit exposure or exposures upon certain events taking place. For example, if a buyer or a seller proposes a purchase order which, if accepted, would exceed a limit causing assurance to be unavailable, the trade program 502 may automatically provide a warning to this affect to the buyer or the seller. As another example, upon a seller's creation of an invoice, the trade program may automatically monitor a buyer's credit exposure and provide warnings that the transaction, or a portion of it, is not assurable, or is only assurable if additional assurance fees are paid.

Additionally, in some instances where a buyer is over assurance limits, the trade program 502, by monitoring anticipated buyer credit exposure, can communicate messages to the seller or the buyer indicating future dates at which the buyer's credit exposure is anticipated to drop to the extent that assurance, or complete assurance, may be available. Further, if a buyer's credit exposure drops due to payment on an invoice, for example, the trade program can automatically monitor the buyers credit exposure, detect the drop caused by the payment, and, if appropriate, inform the seller or the buyer that a transaction or a proposed transaction has become assurable. Still further, such informing can take the form of a communicated graphical representation, for example, indicating credit exposure as a function of time as well as an anticipated date at which assurance is anticipated to be available.

Figure 9:
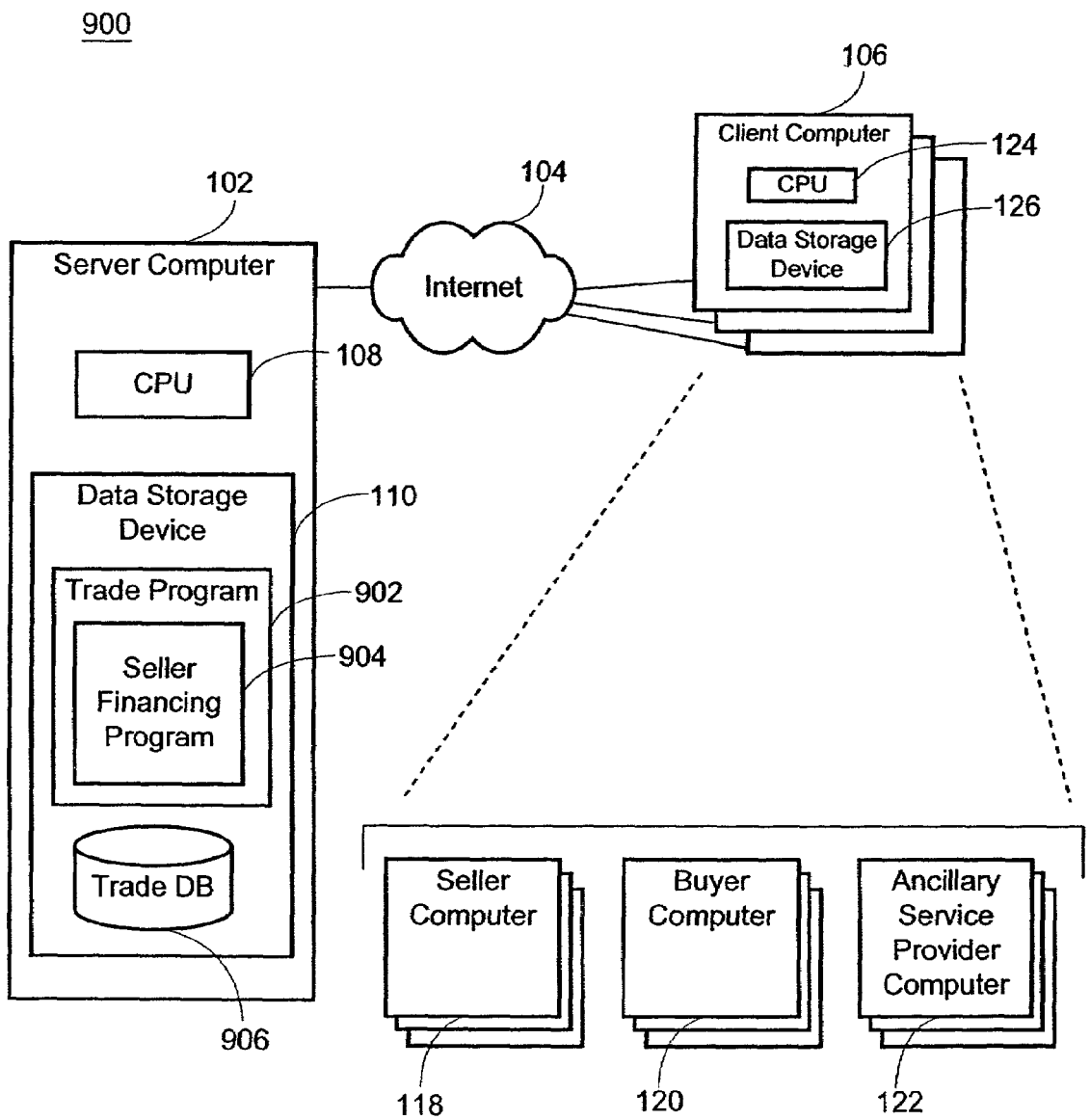
FIG. 9 is a block diagram of a distributed computer system according to one embodiment of the invention, depicting a server computer having a seller financing program.

FIG. 9 is a block diagram of a distributed computer system 900 according to one embodiment of the invention, depicting a server computer 102 having a seller financing program 904. Many components of the system 900 of FIG. 5 have been previously described with reference to system 100 FIG. 1.

The trade program 902 and trade database 906 are intended to include, but not be limited to including, all of the programming and data for carrying out, in various embodiments, some or all of the functions of the Full Service Trade System, as summarized broadly above with regard to the stages of a transaction, and as disclosed in greater detail in the Full Service Trade System Patent and Applications. The seller financing program 904 is intended to represent programming necessary for seller financing functions, as described in detail below, and the trade database 906 is intended to include all of the data necessary for carrying out seller financing functions. Although the seller financing program 904 is depicted conceptually as a unit within the trade program 902, it is to be understood that the seller financing program 904 may comprise programming that is actually incorporated as part of the programming of the trade program 902 itself, or may be a modular component thereof.

Figure 10:
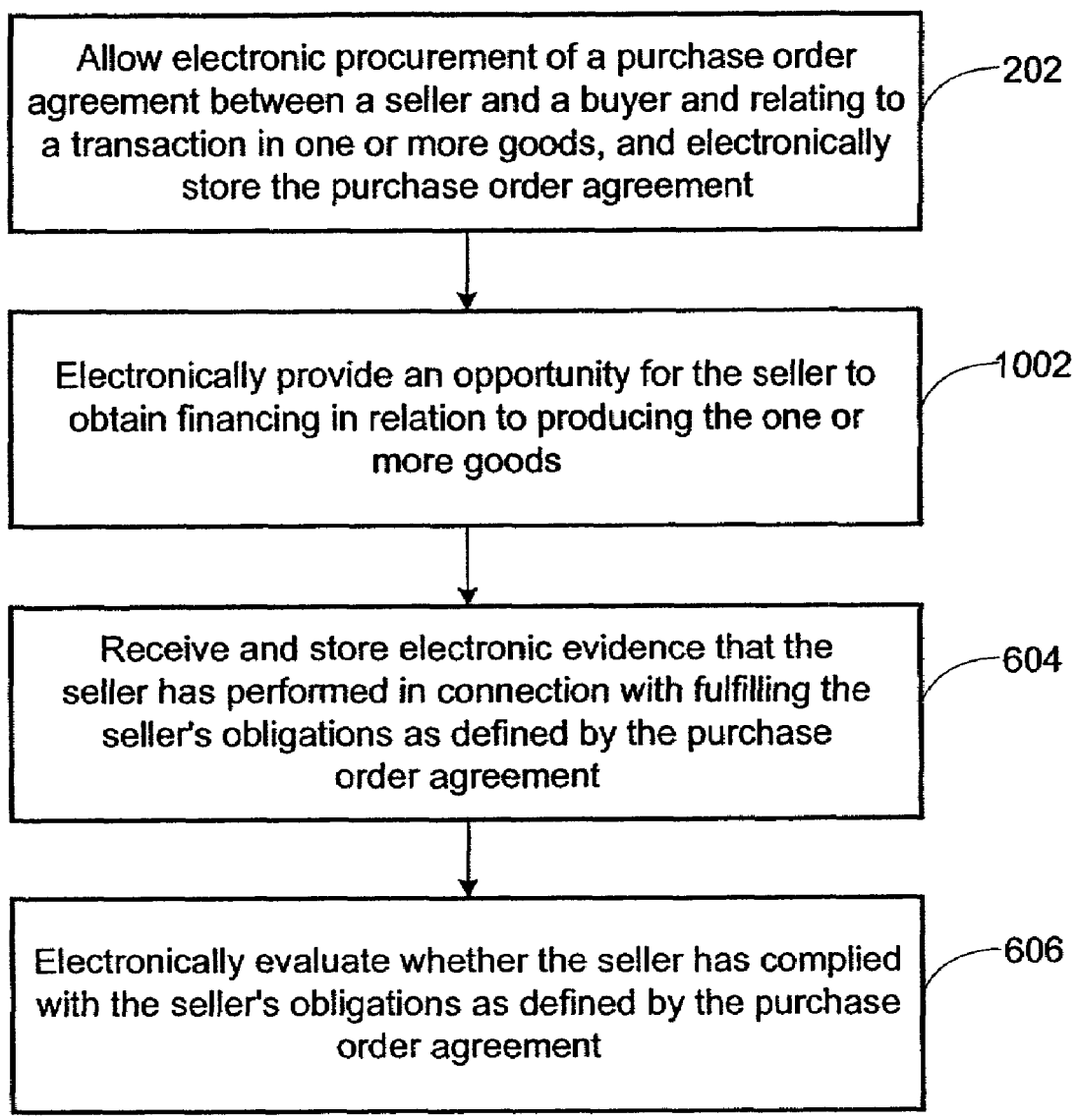
FIG. 10 is a flow diagram depicting a trade method according to one embodiment of the invention, including providing an opportunity for the seller to obtain financing.

FIG. 10 is a flow diagram depicting a trade method according to one embodiment of the invention, including providing an opportunity for the seller to obtain financing.

Method 1000 represents a credit monitoring function incorporated as part of an electronic trade method. At step 202, the trade program 902 allows electronic procurement of a purchase order agreement between the seller and the buyer and relating to a transaction in one or more goods, and electronically stores the purchase order agreement in the trade database 906. Step 202 comprises the system 900 performing procurement stage functions, as disclosed in detail in the Full Service Trade System Patents and Applications.

At step 1002, the trade program 902, utilizing the seller financing program 904, electronically provides an opportunity for the seller to obtain financing in relation to producing the one or more goods.

At step 604, the trade program 902 receives and stores in the trade database 906 electronic evidence that the seller has performed in connection with fulfilling the seller's obligations as defined by the purchase order agreement. This step may represent the seller or other party entering in data to be stored in the trade database 904, such as electronic forms or documents, indicating or proving that the seller has shipped goods to the buyer, the type and quantity of the goods, etc. Step 604 comprises the system 906 performing fulfillment stage functions, as disclosed in detail in the Full Service Trade System Patents and Applications.

At step 606, the trade program 902 electronically evaluates whether the seller has complied with the seller's obligations as defined by the purchase order agreement. Step 606 represents the trade program 902 performing compliance stage functions, including comparing the purchase order agreement to the invoice, etc.

Figure 11:
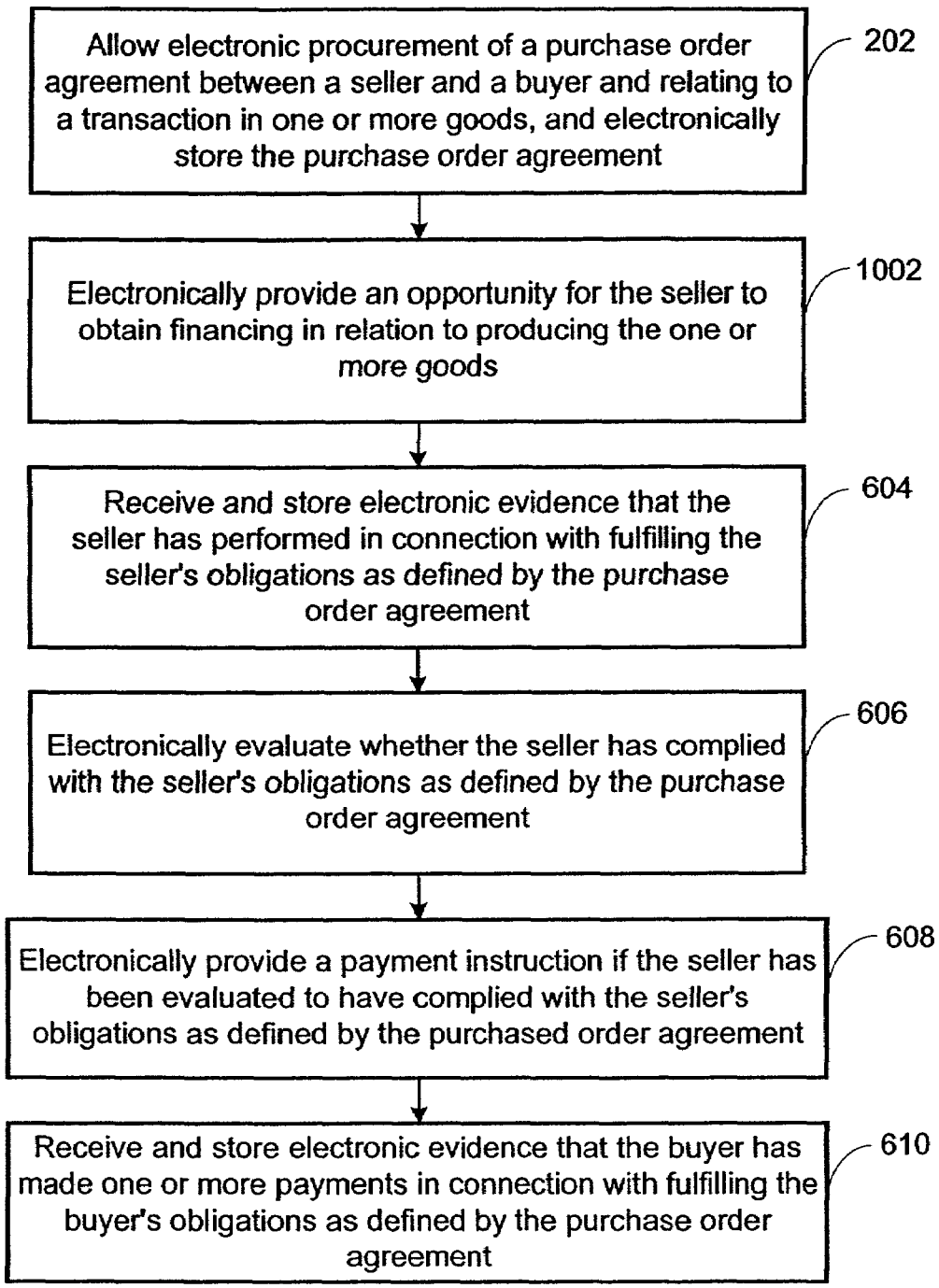
FIG. 11 is a flow diagram depicting a trade method according to one embodiment of the invention, including providing an opportunity for the seller to obtain financing and including providing a payment instruction and receiving evidence of payment by the buyer.

FIG. 11 is a flow diagram depicting a trade method according to one embodiment of the invention, including providing an opportunity for the seller to obtain financing and including providing a payment instruction and receiving evidence of payment by the buyer;

Steps 202 through 606 are described above. Steps 608 and 610 comprise the system 900 performing settlement stage functions, as disclosed in detail in the Full Service Trade System Patents and Application. At step 608, the trade program 902 electronically provides a payment instruction if the seller has been evaluated to have complied with the seller's obligations as defined by the purchase order agreement. For example, step 608 may comprise the system 900 sending an electronic message such as an e-mail message to the buyer to indicate to the buyer that the seller has complied with the seller's obligations and that payment is due from the buyer by the date specified in the purchase order agreement.

At step 610, the trade program 902 receives and stores in the trade database 906 electronic evidence that the buyer has made one or more payments in connection with fulfilling the buyer's obligations as defined by the purchase order agreement. Step 610 may comprise the buyer or another party electronically entering in to the system 900, through an electronic form or otherwise, that a payment has been made, the amount of the payment, the date of payment, etc. Step 610 comprises the system 900 performing the settlement stage functions, as disclosed in detail in the Full Service Trade System Patents and Applications.

In the methods 1000, 1100 depicted in FIGS. 10 and 11, the trade system 900 incorporates the feature of, after a purchase order agreement has been established, providing sellers with an opportunity to obtain financing in order to produce goods to fulfill the seller's obligations under a purchase order agreement. In alternative embodiments of the invention, the opportunity for sellers to obtain financing may occur prior to the establishment of the purchase order agreement.

Allowing sellers to obtain financing can allow a seller to satisfy a purchase order agreement, or to enter into a purchase order agreement, which the seller might otherwise be unable to do. For example, a seller may not have the funds to purchase parts required to produce the goods, yet the seller knows that, through the purchase order agreement, the seller will be entitled to payment from the buyer which will cover the costs of the seller's production and allow acceptable profit. Despite this, the buyer may be unwilling to provide payment until the buyer receives the goods. In this situation, the transaction might not happen unless the seller is able to obtain financing. Thus providing an opportunity for the seller to obtain financing is a useful feature to include as part of a trading system.

In one embodiment, the system 900 accomplishes providing this opportunity by incorporating into the system the participation of, as an ancillary service provider 122, a finance provider such as a financial institution or bank, which finance provider may be compensated for its service by payment from the seller. By incorporating participation of at least all three of the seller, the buyer, and the finance provider, the system 900 creates advantages and efficiencies that would be unavailable if, for instance, the seller had to negotiate for financing separately from the seller's transaction with the buyer.

In one embodiment, the finance provider may be permitted access to the system 900 to allow the finance provider to obtain credit information or seller qualification information stored in the trade database 906 regarding the buyer or the seller so that the finance provider can make an informed decision about whether to provide financing, without the finance provider having to undertake an investigation on its own.

Additionally, the system 900 may allow the finance provider to become directly entitled to payment from the buyer, instead of the seller being so entitled. For example, upon a seller accepting financing, the system trade program 902 may update information, including forms or documents, stored in the trade database 906 to reflect the finance provider's entitlement. In effect, this allows a finance provider to become a party to the transaction, eliminating any possibility of the seller misdirecting received payment from the buyer, and the system 900 can thus provide security and efficiency for the finance provider. Similarly, any credit assurance proceeds or cargo insurance proceeds (as discussed below with reference to FIGS. 13-16) can be assigned to go directly to the finance provider.

Further, in some embodiments, the finance provider is allowed continuous access to information stored in the trade database 906 relating to the involved transaction. For example, the finance provider may be able to access the trade database to obtain buyer credit exposure information. In some embodiments, the finance provider's access may be limited, such as by allowing the finance provider only to access certain information about the transaction, while not allowing the finance provider to access information considered immaterial to the finance provider's role. Additionally, the finance provider may be able to access transaction information but not modify the information. Also, the trade system 900 may allow the finance provider to continually obtain frequently updated, real time or almost real time information pertaining to the involved transaction, which up to date information might be difficult or impossible for the finance provider to obtain without the system 900. Furthermore, by the finance provider being incorporated into the system 900, the seller need not go through trouble of proving to the finance provider, by paper documents or otherwise, information relating to the transaction or to the seller's qualifications. In embodiments of the invention in which payment instructions are provided by the system 900, the trade program 900 can cause such instructions to indicate that payment, or a portion of it, should be provided to the finance provider instead of the seller.

Figure 12:
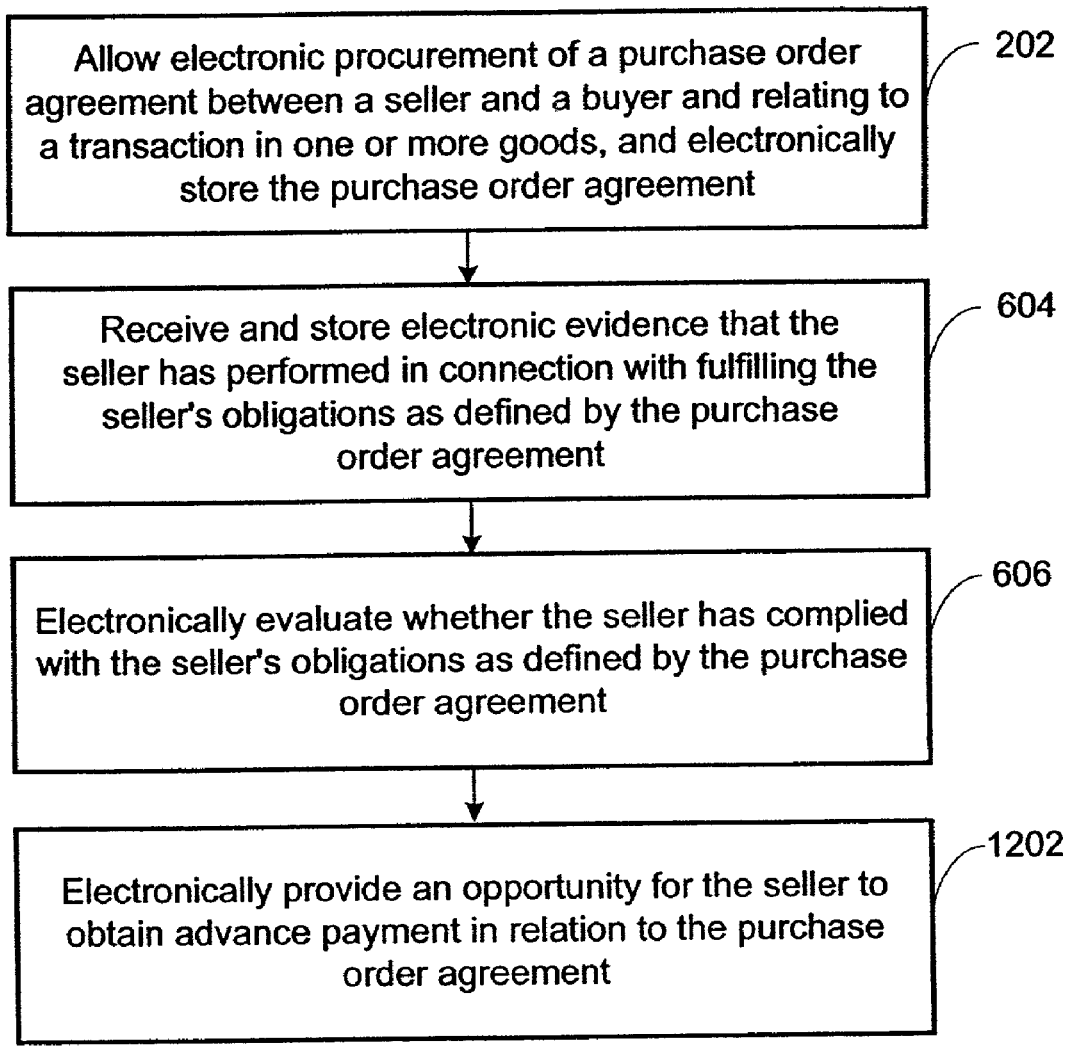
FIG. 12 is a flow diagram depicting a trade method according to one embodiment of the invention, including providing an opportunity for the seller to obtain advance payment.

FIG. 12 is a flow diagram depicting a trade method 1200 according to one embodiment of the invention, including providing an opportunity for the seller to obtain advance payment. Step 202 through 606 are described above. At step 1202, the trade program 1202, utilizing the seller financing program 904, electronically provides an opportunity for the seller to obtain advance payment in relation to the purchase order agreement.

Figure 13:
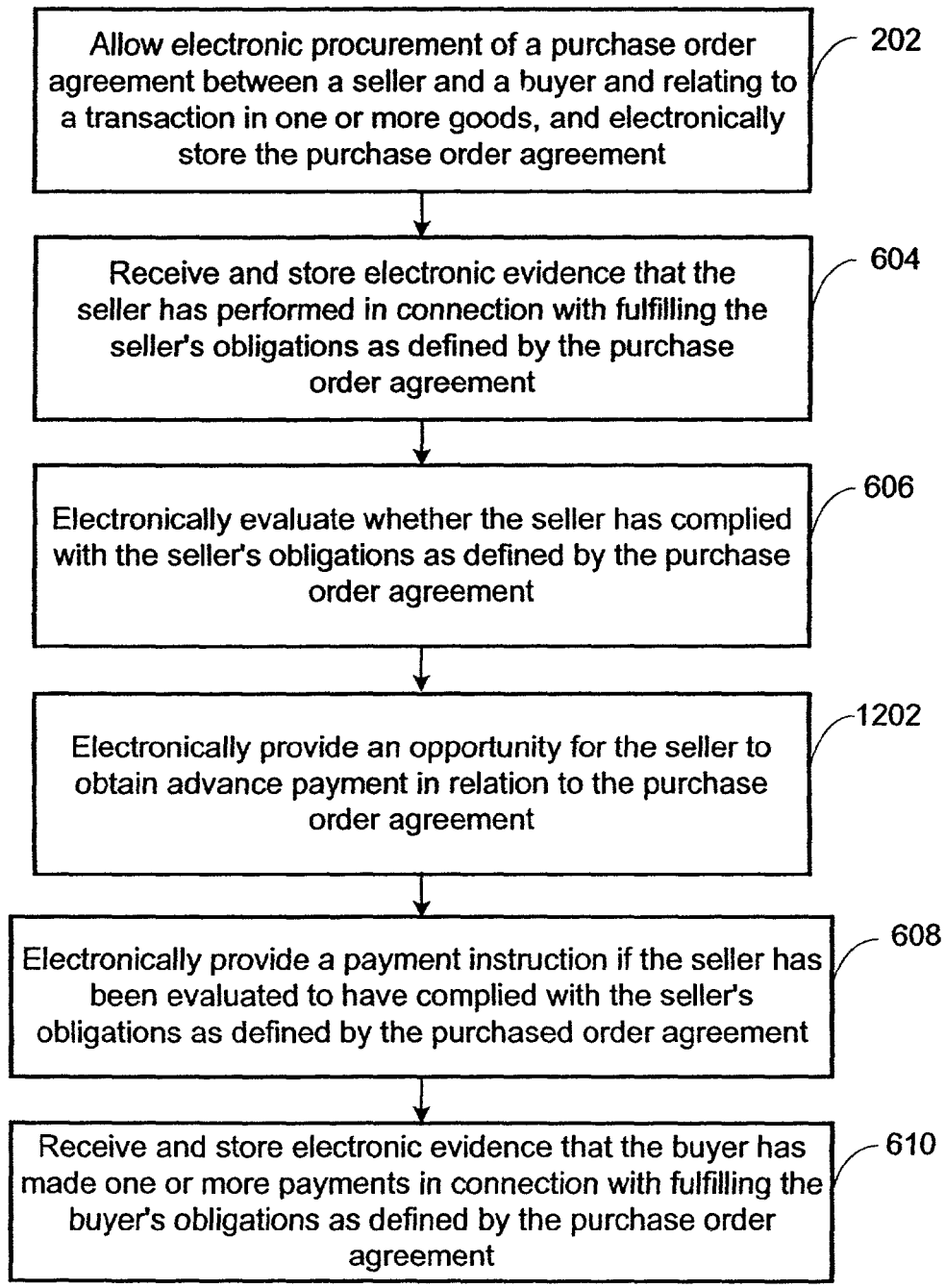
FIG. 13 is a flow diagram depicting a trade method according to one embodiment of the invention, including providing an opportunity for the seller to obtain advance payment and including providing a payment instruction and receiving evidence of payment by the buyer.

FIG. 13 is a flow diagram depicting a trade method 1300 according to one embodiment of the invention, including providing an opportunity for the seller to obtain advance payment and including providing a payment instruction and receiving evidence of payment by the buyer.

Steps 202 through 1202 are described above. Steps 608 and 610 comprise the system 900 performing settlement stage functions, as disclosed in detail in the Full Service Trade System Patents and Application. At step 608, the trade program 902 electronically provides a payment instruction if the seller has been evaluated to have complied with the seller's obligations as defined by the purchase order agreement. For example, step 608 may comprise the system 900 sending an electronic message such as an e-mail message to the buyer to indicate to the buyer that the seller has complied with the seller's obligations and that payment is due from the buyer by the date specified in the purchase order agreement.

At step 610, the trade program 902 receives and stores in the trade database 906 electronic evidence that the buyer has made one or more payments in connection with fulfilling the buyer's obligations as defined by the purchase order agreement. Step 610 may comprise the buyer or another party electronically entering in to the system 900, through an electronic form or otherwise, that a payment has been made, the amount of the payment, the date of payment, etc. Step 610 comprises the system 900 performing the settlement stage functions, as disclosed in detail in the Full Service Trade System Patents and Applications.

The methods 1200, 1300 described with reference to FIGS. 13-14 share many of the advantages of and are in many ways similar to the methods 1000, 1100 described above with reference to FIGS. 10-11, and the discussion above associated with providing an opportunity to obtain financing is relevant also to providing an opportunity for a seller to obtain advance payment. For example, the advance payment provider may be a financial institution which may have access or limited access to the trade database 906 to obtain information relevant to the advance payment provider's role. Additionally, the advance payment provider may be entitled to direct payment from the seller, and any payment instructions provided by the system may reflect this.

Providing an opportunity for sellers to obtain advance payment allows sellers not only to obtain the funds more quickly, but also to eliminate any risk of loss due to failure of the buyer to provide payment, for which benefit the seller may compensate the advance payment provider. In the embodiments depicted in FIGS. 12 and 13, the opportunity for the seller to obtain financing occurs after the compliance procedure in step 606. In some embodiments, the opportunity may not be provided until the system evaluates the seller to have complied with the sellers obligations, such as by shipping conforming goods in accordance with the purchase order agreement, or, if the seller has been evaluated to have not fully complied, until the buyer has been evaluated to have waived any rights the buyer may have to avoid payment. In this way, the advance payment provider can be assured of its right to receive payment from the buyer.

Appendix A comprises, at pages 55 to 61, process flow diagrams according to some embodiments of the invention. Appendix A, which is not meant to be limiting, but rather illustrative of particular embodiments of the invention, is incorporated into and forms a part of the Detailed Description of the present application. Page 55 illustrates a pre-shipment seller financing process flow, according to one embodiment of the invention. Page 56 illustrates a process flow which illustrates one embodiment of providing seller financing, in which a finance provider is notified if certain amendments are made to a purchase order agreement. Page 57 illustrates a process flow including cancellation of a seller financing request and notification of certain parties of the cancellation. Page 58 illustrates a post-shipment seller financing request process flow. Page 59 illustrates a settlement process flow for pre-shipment seller financing and post-shipment seller financing. Page 60 illustrates a post-compliance seller financing request process flow. Page 61 illustrates seller financing settlement process flow.

Appendix A, at Page 62 through 64, illustrates examples of seller financing request electronic documents and layouts. Page 65 illustrates an example of information which may be made available to a seller finance provider. Pages 66 through 68 illustrate an example summary of procedures for providing seller financing.

Figure 14:
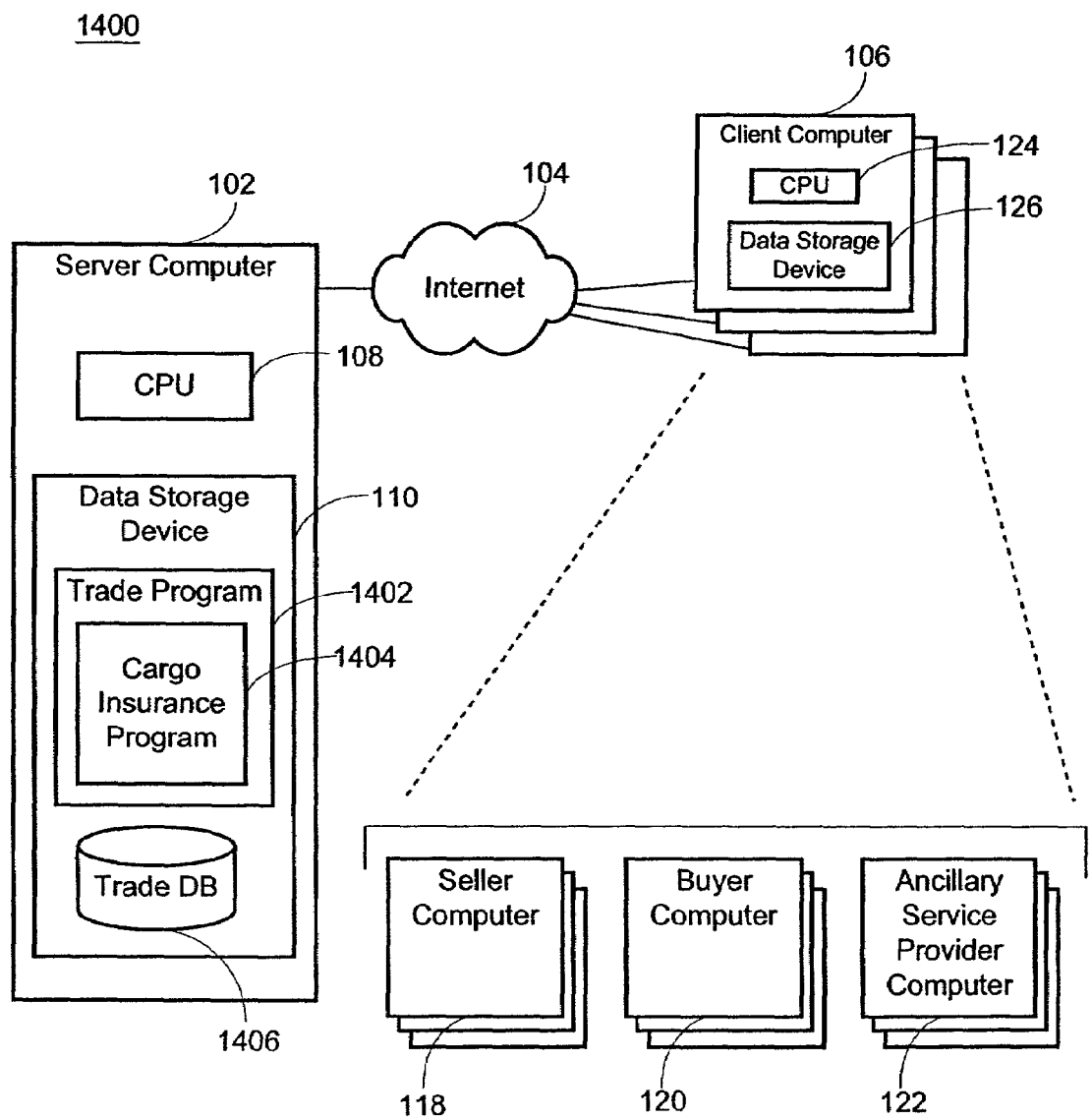
FIG. 14 is a block diagram of a distributed computer system according to one embodiment of the invention, depicting a server computer having a cargo insurance program.

FIG. 14 is a block diagram of a distributed computer system 1400 according to one embodiment of the invention, depicting a server computer 102 having a cargo insurance program 1404. Many components of the system 1400 of FIG. 14 have been previously described with reference to system 100 FIG. 1.

The trade program 1402 and trade database 1406 are intended to include, but not be limited to including, all of the programming and data for carrying out, in various embodiments, some or all of the functions of the Full Service Trade System, as summarized broadly above with regard to the stages of a transaction, and as disclosed in greater detail in the Full Service Trade System Patent and Applications. The cargo insurance program 1404 is intended to represent programming necessary for providing cargo insurance, as described in detail below, and the trade database 1406 is intended to include all of the data necessary for carrying out that function. Although the cargo insurance program 1404 is depicted conceptually as a unit within the trade program 1402, it is to be understood that the cargo insurance program 1404 may comprise programming that is actually incorporated as part of the programming of the trade program 1402 itself, or may be a modular component thereof.

Figure 15:
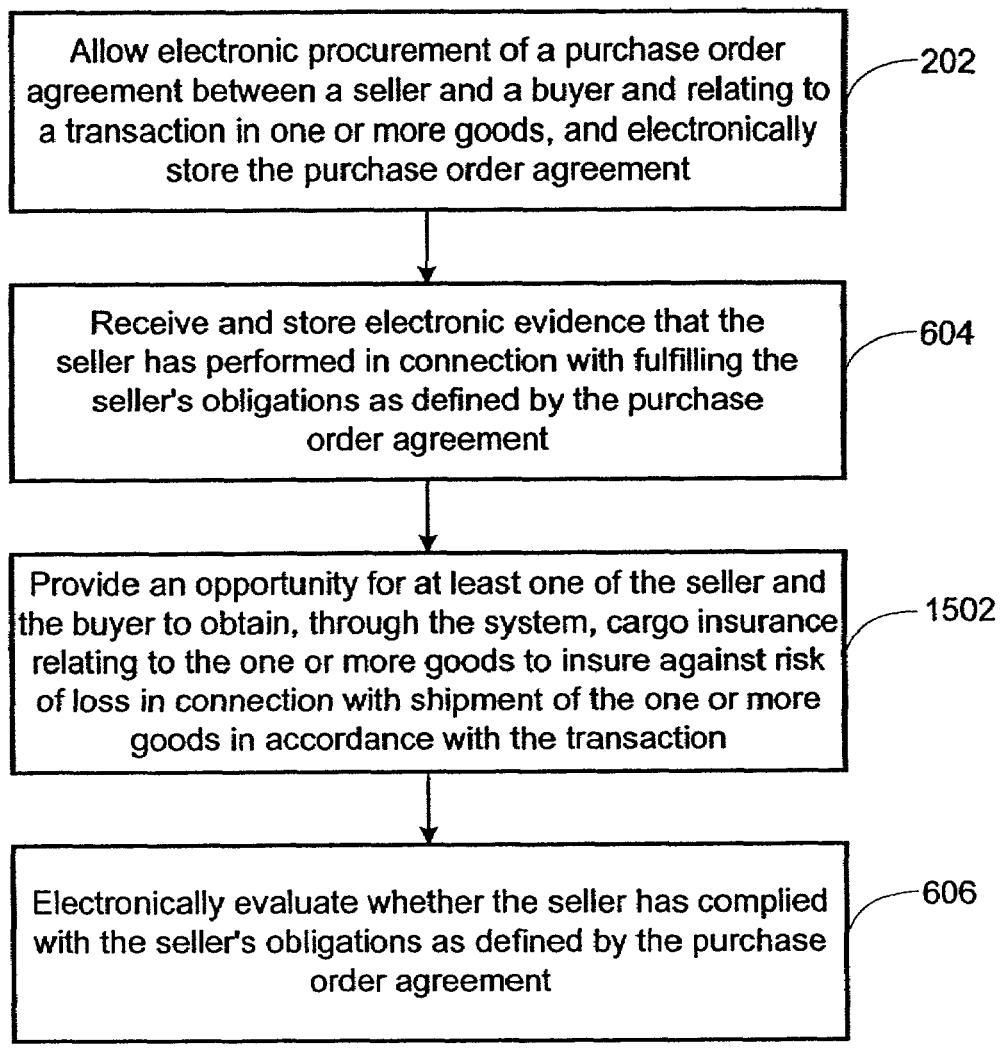
FIG. 15 is a flow diagram depicting a trade method according to one embodiment of the invention, including providing an opportunity for a seller or a buyer to obtain cargo insurance through the system.

FIG. 15 is a flow diagram depicting a trade method 1500 according to one embodiment of the invention, including providing an opportunity for a seller or a buyer to obtain cargo insurance through the system.

Method 1500 incorporates a function of providing cargo insurance as part of an electronic trade method. The method 1500 provides an opportunity for one or both transactional parties to obtain cargo insurance relating to a transaction. At step 202, the trade program 1402 allows electronic procurement of a purchase order agreement between the seller and the buyer and relating to a transaction in one or more goods, and electronically stores the purchase order agreement in the trade database 1406. Step 202 comprises the system 1400 performing procurement stage functions, as disclosed in detail in the Full Service Trade System Patents and Applications.

At step 604, the trade program 1402 receives and stores in the trade database 1406 electronic evidence that the seller has performed in connection with fulfilling the seller's obligations as defined by the purchase order agreement. This step may represent the seller or other party entering in data to be stored in the trade database 1406, such as electronic forms or documents, indicating or proving that the seller has shipped goods to the buyer, the type and quantity of the goods, etc. Step 604 comprises the system 1400 performing fulfillment stage functions, as disclosed in detail in the Full Service Trade System Patents and Applications.

At step 1502, the trade program 1402, utilizing the cargo insurance program 1404, provides an opportunity for at least one of the transactional parties to obtain, through the system 1400, cargo insurance relating to the one or more goods or services to be shipped in accordance with the purchase order agreement, to insure against risk of loss in connection with shipment of the one or more goods or services.

At step 606, the trade program 1402 electronically evaluates whether the seller has complied with the seller's obligations as defined by the purchase order agreement. Step 606 represents the trade program 1402 performing compliance stage functions, including comparing the purchase order agreement to the invoice, etc.

Figure 16:
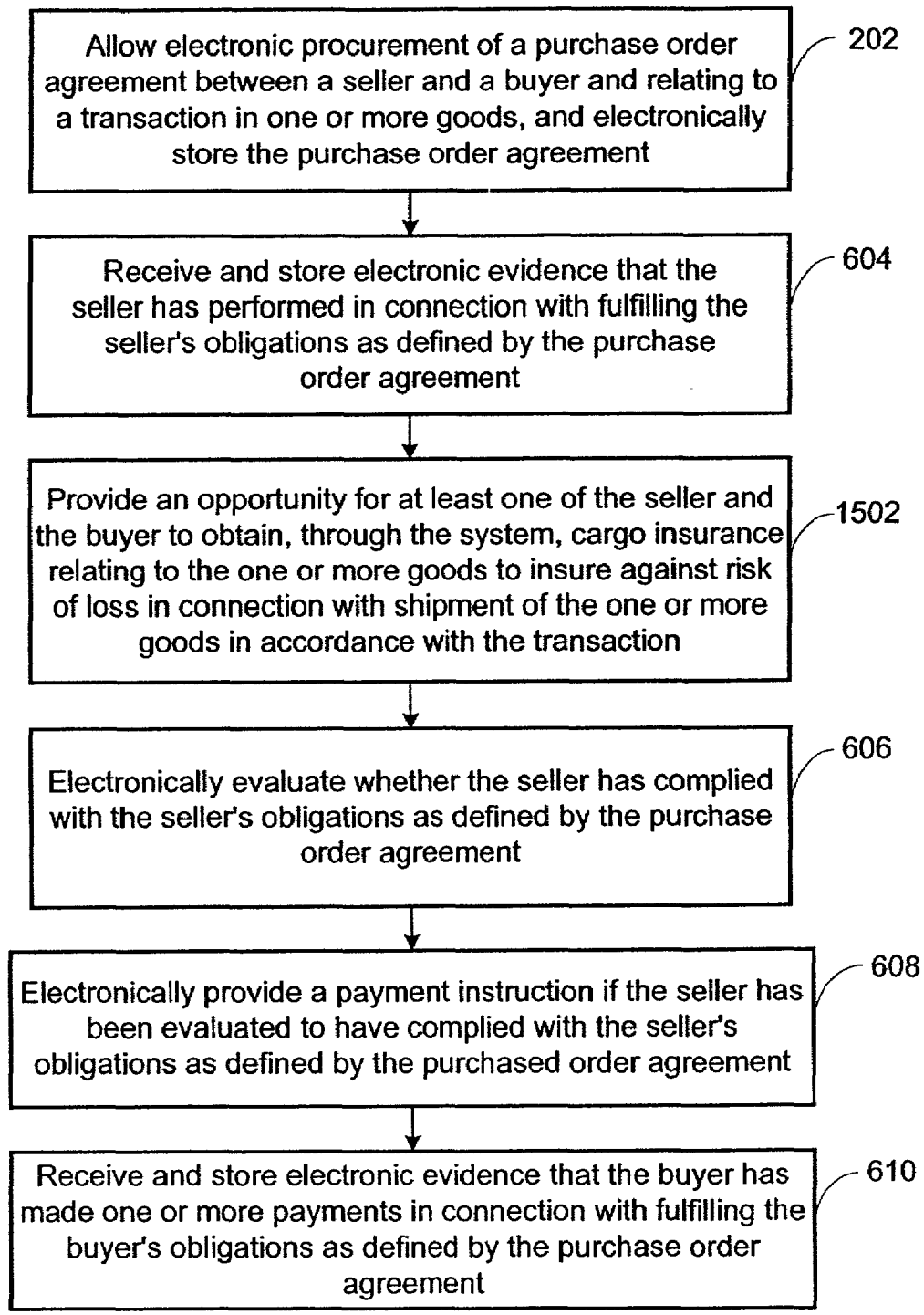
FIG. 16 is a flow diagram depicting a trade method according to one embodiment of the invention, including providing an opportunity for a seller or a buyer to obtain cargo insurance through the system and including providing a payment instruction and receiving evidence of payment by the buyer.

FIG. 16 is a flow diagram depicting a trade method 1600 according to one embodiment of the invention, including providing an opportunity for a transactional party to obtain cargo insurance through the system and including providing a payment instruction and receiving evidence of payment by the buyer.

Steps 202 through 606 are described above. Steps 608 and 610 comprise the system 1400 performing settlement stage functions, as disclosed in detail in the Full Service Trade System Patents and Application. At step 608, the trade program 1402 electronically provides a payment instruction if the seller has been evaluated to have complied with the seller's obligations as defined by the purchase order agreement. For example, step 608 may comprise the system 1400 sending an electronic message such as an e-mail message to the buyer to indicate to the buyer that the seller has complied with the seller's obligations and that payment is due from the buyer by the date specified in the purchase order agreement.

At step 610, the trade program 1402 receives and stores in the trade database 1406 electronic evidence that the buyer has made one or more payments in connection with fulfilling the buyer's obligations as defined by the purchase order agreement. Step 610 may comprise the buyer or another party electronically entering in to the system 1400, through an electronic form or otherwise, that a payment has been made, the amount of the payment, the date of payment, etc. Step 610 comprises the system 1400 performing the settlement stage functions, as disclosed in detail in the Full Service Trade System Patents and Applications.

The methods 1500, 1600 of FIGS. 15 and 16 depict embodiments of the invention incorporating the feature of allowing one or both of the transactional parties to obtain cargo insurance to cover shipment of the goods in accordance with the transaction. It is important to note that, in the methods 1500, 1600 depicted, the system 1400 itself provides the opportunity. For example, in one embodiment, the system 1400 is implemented through the Internet, and buyers and sellers access the system 1400 through a Web site. In this embodiment, cargo insurance may be offered and may be purchased without leaving the Web site itself. This is in contrast to a trade system in which a party who may desire to purchase cargo insurance are linked to a separate Web site through which the party may make arrangements separate from the trade system.

In traditional transactional methods, cargo insurance, if obtained, is obtained by one of the transactional parties to cover risk of loss in connection only with that portion of the shipment process during which risk of loss is with the purchasing party. For example, various shipping terms, or Inco terms such F.O.B. (free on board), etc., which may be stored by the system 1400 in association with particular transactions, are associated with different allocations between the transactional parties of risk of loss through different portions or segments of the shipment process. Thus, to cover the entire shipment process, each party must purchase a cargo insurance policy to cover that portion of the shipping process during which risk of loss falls upon that party.

However, the trade system 1400 of the present invention, due to its ability to comprehensively facilitate and store information relating to a transaction, allows the system 1500 to incorporate the feature of being able to provide a "door to door" insurance policy, which single insurance policy covers the shipped goods throughout the entire shipment process and shipment time. In one embodiment, the cargo insurance cost, or quote, may be calculated by the system based on parameters stored in the trade database 1406, such as the ship-from location and the ship-to location, the means of transportation, and the cost of the goods. In one embodiment, the trade program 1402 determines which party is provided the opportunity to purchase cargo insurance based upon which party is evaluated by the trade program 1402 to bear a majority of the risk of loss during shipment. For example, in one embodiment, the trade program 1402 determines which transactional party to whom to provide the opportunity to purchase cargo insurance based upon the shipping term. In other embodiments, the trade program may determine which transactional party to whom to provide the opportunity to purchase cargo insurance based upon other parameters, such as which party bears risk for the majority of the distance of the shipment, or the majority of the time of shipment, or based on other parameters, which parameters may be evaluated based on information relating to the transaction and stored in the trade database 1406. The system 1400, in being able to provide a door to door cargo insurance policy due in part to the comprehensive transactional information stored in the trade database 1406, offers a new and valuable way to provide and obtain cargo insurance.

In some embodiments, the system 1400 offers a single door to door insurance policy, but requires that the seller and the buyer both agree to contribute to the cost, or premium, for the insurance. The cost may be proportioned between the buyer and the seller based on a percentage of risk of loss associated with shipment evaluated by the trade program 1402 to lie with the seller, and a percentage evaluated to lie with the buyer, which percentages may be calculated based on various parameters, as described above.

In the embodiment depicted in FIG. 1600, the system 1400 facilitates the settlement process, as included in steps 608 and 610. In one embodiment, the trade program 1402, upon purchase of cargo insurance through the system, the trade program 1402 produces an electronic proof of cargo insurance document in accordance with the purchased policy. In one embodiment, the trade program 1402 automatically provides an electronic message inviting an appropriate transactional party to purchase cargo insurance through the system 1400, and may provide an automatically calculated quote. In some embodiments of the invention, although the cargo insurance is purchased through the system 1400, the actual cargo insurance provider is an ancillary service provider 122, separate from but associated with the system 1400 or a provider of the system 1400.

In traditional, paper transactional systems, a cargo insurance provider typically only deals with and knows one of the transacting policies, and therefore may only provide an insurance policy covering the shipment to the extent that that party bears the risk of loss. The system 1400 of the invention, however, by incorporating seller, buyer, and cargo insurance provider, as well as maintaining a trade database 1406 with information about a transaction, makes it efficient for a cargo insurance provider to offer a single door to door cargo insurance policy to one or to both of the transacting parties.

Appendix A, at page 69 illustrates a chart providing an example of allocation of responsibilities between a seller and a buyer based upon Inco terms. Page 70 illustrates one example of a set of electronic checks that may be run to determine cargo insurance eligibility, according to one embodiment of the invention. Page 71 illustrates an example of a cargo insurance quote document. Page 72 illustrates an example of an electronic proof of cargo insurance document which may be generated. Pages 73 through 75 illustrate process flows incorporating providing an opportunity for a seller or a buyer to purchase cargo insurance, including a procurement process flow at page 73, a fulfillment process flow at page 74, and a settlement process flow at page 75.

It is to be understood that the invention contemplates embodiments in which a trade program incorporates several or all of the programs which have been described herein as being part of a trade program in various embodiments of the invention, which can be utilized together in a trade system in an integrated fashion.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A computerized system for facilitating transactions in goods over an electronic communication network, the system comprising:
   a processor;
   an electronic storage device;
   wherein the processor is configured to:
   allow electronic procurement of a purchase order agreement between a seller and a buyer and relating to a transaction in one or more goods, and electronically store the purchase order agreement;
   receive electronic evidence that the seller has performed in connection with fulfilling the seller's obligations as defined by the purchase order agreement;
   store the electronic evidence to the electronic storage device that the seller has performed in connection with fulfilling the seller's obligations as defined by the purchase order agreement;
   electronically provide an opportunity for at least one of the seller and the buyer to obtain, through the system, cargo insurance relating to the one or more goods to insure against risk of loss in connection with shipment of the one or more goods in accordance with the transaction, wherein the cargo insurance provides coverage over a specified period of time and insures against a risk of loss in relation to the one or more goods occurring at any time during shipment of the one or more goods from the seller to the buyer;
   electronically evaluate whether the seller has complied with the seller's obligations as defined by the purchase order agreement;
   electronically provide a payment instruction if the seller has been evaluated to have complied with the seller's obligations as defined by the purchase order agreement;
   receive electronic evidence that the buyer has made one or more payments in connection with fulfilling buyer's obligations as defined by the purchase order agreement;
   store the electronic evidence to the electronic storage device that the buyer has made one or more payments in connection with fulfilling buyer's obligations as defined by the purchase order agreement;
   determine, based upon one or more shipping terms comprising one or more International Commercial (Inco) shipping terms agreed to by the seller and the buyer and electronically stored by the system, which one of the seller and the buyer bears a majority of the risk of loss for at least one of a greater amount of shipping distance and a greater amount of shipping time;
   automatically calculate a cargo insurance premium required to purchase the cargo insurance based upon information electronically stored in the system and comprising at least one of a location to be shipped from, a location to be shipped to, a means of shipment, and a party responsible for purchasing of the one or more goods; and
   determine that the cargo insurance, if purchased, must be purchased together by the seller and the buyer through the system such that the seller agrees to pay a first percentage of the premium required to obtain the cargo insurance and the buyer agrees to pay a second percentage of the premium.

2. The system of claim 1, the processor further configured to determine that an obligation to pay the insurance premium must be shared between the seller and the buyer such that each of the seller and the buyer are obligated to pay a specified percentage determined by the system.

3. The system of claim 1, the processor further configured to determine the first percentage and the second percentage, wherein the first percentage and the second percentage are determined to correspond with a ratio of the seller's risk of loss in relation to the one or more goods occurring during shipping and the buyer's risk of loss in relation to the one or more goods occurring during shipping.

4. The system of claim 3, wherein the ratio is determined based upon one or more shipping terms agreed to by the seller and the buyer and electronically stored by the system.

5. The system of claim 1, wherein the cargo insurance insures against risk in connection with at least one of noninsurance of the one or more goods, underinsurance of the one or more goods, and partial insurance of the one or more goods.

6. The system of claim 1, wherein the cargo insurance insures against risk of loss in connection with damage to the goods.

7. The system of claim 1, wherein the cargo insurance insures against risk of at least one of loss of the goods and loss resulting from damage to the goods, and wherein the cargo insurance covers risk existing during transit of the goods, the transit not necessarily being limited to movement of the goods from a location of the seller to a location of the buyer.

8. The system of claim 1, wherein the cargo insurance is purchased by one of the seller and the buyer through the system, and wherein the cargo insurance is for the benefit of both the seller and the buyer.

9. A computer-implemented method for facilitating transactions in goods over an electronic communication network, comprising:
   allowing electronic procurement of a purchase order agreement between a seller and a buyer and relating to a transaction in one or more goods;
   electronically storing the purchase order agreement;
   receiving electronic evidence over the electronic communication network that the seller has performed in connection with fulfilling the seller's obligations as defined by the purchase order agreement;
   storing the electronic evidence that the seller has performed in connection with fulfilling the seller's obligations as defined by the purchase order agreement;
   electronically providing over the electronic communication network an opportunity for at least one of the seller and the buyer to obtain, through the system, cargo insurance relating to the one or more goods to insure against risk of loss in connection with shipment of the one or more goods in accordance with the transaction, wherein the cargo insurance provides coverage over a specified period of time and insures against a risk of loss in relation to the one or more goods occurring at any time during shipment of the one or more goods from the seller to the buyer;
   electronically evaluating whether the seller has complied with the seller's obligations as defined by the purchase order agreement;
   electronically providing a payment instruction over the electronic communication network if the seller has been evaluated to have complied with the seller's obligations as defined by the purchase order agreement;
   receiving electronic evidence over the electronic communication network that the buyer has made one or more payments in connection with fulfilling buyer's obligations as defined by the purchase order agreement;
   storing the electronic evidence that the buyer has made one or more payments in connection with fulfilling buyer's obligations as defined by the purchase order agreement;

determining, based upon one or more shipping terms comprising one or more Inco shipping terms agreed to by the seller and the buyer and electronically stored by the system, which one of the seller and the buyer bears a majority of the risk of loss for at least one of a greater amount of shipping distance and a greater amount of shipping time;

automatically calculating by a computer processor a cargo insurance premium required to purchase the cargo insurance based upon information electronically stored in the system and comprising at least one of a location to be shipped from, a location to be shipped to, a means of shipment, and a party responsible for purchasing of the one or more goods; and determining that the cargo insurance, if purchased, must be purchased together by the seller and the buyer through the system such that the seller agrees to pay a first percentage of the premium required to obtain the cargo insurance and the buyer agrees to pay a second percentage of the premium.

10. The method of claim 9, further comprising determining that an obligation to pay the insurance premium must be shared between the seller and the buyer such that each of the seller and the buyer are obligated to pay a specified percentage determined by the system.

11. The method of claim 9, further comprising determining the first percentage and the second percentage, wherein the first percentage and the second percentage are determined to correspond with a ratio of the seller's risk of loss in relation to the one or more goods occurring during shipping and the buyer's risk of loss in relation to the one or more goods occurring during shipping.

12. The method of claim 11, wherein the ratio is determined based upon one or more shipping terms agreed to by the seller and the buyer and electronically stored by the system.

13. The method of claim 9, wherein the cargo insurance is purchased by one of the seller and the buyer through the system, and wherein the cargo insurance is for the benefit of both the seller and the buyer.

* * * * *